US007973670B2

(12) United States Patent
Iwabuchi et al.

(10) Patent No.: US 7,973,670 B2
(45) Date of Patent: Jul. 5, 2011

(54) DISPLAY DEVICE AND METHOD FOR INSPECTING THE SAME

(75) Inventors: Tomoyuki Iwabuchi, Kanagawa (JP); Tatsuro Ueno, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 777 days.

(21) Appl. No.: 11/615,698

(22) Filed: Dec. 22, 2006

(65) Prior Publication Data

US 2007/0159742 A1 Jul. 12, 2007

(30) Foreign Application Priority Data

Dec. 28, 2005 (JP) ................................ 2005-378290

(51) Int. Cl.

| | |
|---|---|
| ***G08B 21/00*** | (2006.01) |
| *H02H 9/00* | (2006.01) |
| *G09G 3/32* | (2006.01) |
| *G09G 5/00* | (2006.01) |
| *H05B 37/00* | (2006.01) |

(52) U.S. Cl. ............ 340/650; 361/54; 345/82; 345/204; 315/121

(58) Field of Classification Search .................. 340/650; 361/54; 345/82, 204; 315/121
See application file for complete search history.

(56) References Cited

U.S. PATENT DOCUMENTS 5,594,463 A 1/1997 Sakamoto
6,225,912 B1 5/2001 Tanaka et al.
6,400,101 B1 6/2002 Biebl et al.
6,528,951 B2 3/2003 Yamazaki et al.
6,710,548 B2 3/2004 Kimura
6,720,198 B2 4/2004 Yamagata et al.
6,724,156 B2 4/2004 Fregoso
6,788,003 B2 9/2004 Inukai et al.
6,853,370 B2 2/2005 Numao
6,870,192 B2 * 3/2005 Yamazaki et al. .............. 257/79

(Continued)

FOREIGN PATENT DOCUMENTS

EP 1 580 720 9/2005

(Continued)

OTHER PUBLICATIONS

European Search Report (Application No. 06026497.5), dated Apr. 23, 2007, 8 pages.

(Continued)

*Primary Examiner* — George A Bugg
*Assistant Examiner* — Jack Wang
(74) *Attorney, Agent, or Firm* — Fish & Richardson P.C.

(57) ABSTRACT

An object is to provide a display device, in a part of which a monitor light emitting element is provided and in which an anode and a cathode of the monitor light emitting element are prevented from short-circuiting in an early stage and over time by using a circuit which corrects a voltage or a current to be supplied to a light emitting element in consideration of electrical property fluctuation of the monitor light emitting element, and a method for inspecting the display device. A monitor light emitting element is provided, which is electrically connected to a monitor line for supplying a current is provided, and a circuit is provided, which electrically disconnects the monitor light emitting element when an anode and a cathode of the monitor light emitting element are short-circuited in an early stage or over time. Further, a circuit for checking circuit operation before or after a step of providing the monitor light emitting element is provided.

11 Claims, 23 Drawing Sheets

U.S. PATENT DOCUMENTS

| | | | |
|---|---|---|---|
| 7,245,297 | B2 | 7/2007 | Kimura et al. |
| 2001/0030511 | A1 | 10/2001 | Yamazaki et al. |
| 2001/0033252 | A1 | 10/2001 | Yamazaki et al. |
| 2002/0089496 | A1 | 7/2002 | Numao |
| 2003/0122749 | A1 | 7/2003 | Booth, Jr. et al. |
| 2003/0214467 | A1 | 11/2003 | Koyama et al. |
| 2004/0027320 | A1* | 2/2004 | Ochi et al. ...................... 345/84 |
| 2004/0100463 | A1 | 5/2004 | Miyagawa et al. |
| 2004/0169980 | A1* | 9/2004 | Amano et al. ............... 361/93.1 |
| 2004/0178726 | A1 | 9/2004 | Yamagata et al. |
| 2004/0246757 | A1* | 12/2004 | Miyagawa ...................... 365/63 |
| 2004/0263444 | A1 | 12/2004 | Kimura |
| 2005/0012731 | A1 | 1/2005 | Yamazaki et al. |
| 2005/0017963 | A1 | 1/2005 | Yamazaki et al. |
| 2005/0017964 | A1 | 1/2005 | Yamazaki et al. |
| 2005/0116655 | A1* | 6/2005 | Yazawa ...................... 315/169.3 |
| 2005/0174818 | A1* | 8/2005 | Lin et al. ......................... 363/98 |
| 2005/0212730 | A1 | 9/2005 | Sato et al. |
| 2005/0285823 | A1 | 12/2005 | Kimura et al. |
| 2006/0033452 | A1 | 2/2006 | Yamazaki et al. |
| 2006/0038501 | A1 | 2/2006 | Koyama et al. |
| 2006/0038804 | A1* | 2/2006 | Hayakawa et al. ........... 345/204 |
| 2006/0244699 | A1* | 11/2006 | Yamazaki ....................... 345/82 |
| 2007/0132793 | A1 | 6/2007 | Miyagawa et al. |
| 2008/0012801 | A1 | 1/2008 | Kimura et al. |
| 2009/0122049 | A1 | 5/2009 | Miyagawa et al. |
| 2009/0224676 | A1* | 9/2009 | Osame et al. ................. 315/121 |
| 2010/0020060 | A1 | 1/2010 | Miyagawa et al. |

FOREIGN PATENT DOCUMENTS

| | | | |
|---|---|---|---|
| EP | 1 598 804 | A2 | 11/2005 |
| JP | 02-287492 | A | 11/1990 |
| JP | 04-128875 | A | 4/1992 |
| JP | 05-283748 | A | 10/1993 |
| JP | 07-036409 | A | 2/1995 |
| JP | 11-087774 | A | 3/1999 |
| JP | 2002-278498 | A | 9/2002 |
| JP | 2002-318546 | A | 10/2002 |
| JP | 2002-333861 | | 11/2002 |
| JP | 2003-317944 | A | 11/2003 |
| JP | 2004-170943 | A | 6/2004 |
| WO | 2004/040541 | A1 | 5/2004 |
| WO | WO 2006/011666 | A1 | 2/2006 |
| WO | WO2006-016706 | | 2/2006 |

OTHER PUBLICATIONS

Office Action, European Application No. 06026497.5; EP09311, dated Nov. 25, 2010, 6 pages, in English.

* cited by examiner

DISPLAY DEVICE AND METHOD FOR INSPECTING THE SAME

BACKGROUND OF THE INVENTION

1. Field of the Invention

The present invention relates to a display device including a light emitting element and a method for inspecting the display device.

2. Description of the Related Art

A light emitting element has a self-light emitting property; therefore, it is superior in visibility and viewing angle. Accordingly, a light emitting device including a light emitting element has attracted attention, along with a liquid crystal display device (LCD).

An organic EL element in which a plurality of organic layers is interposed between an anode and a cathode is given as an example of the light emitting element. The organic layers specifically include a light emitting layer, a hole injection layer, an electron injection layer, a hole transport layer, an electron transport layer, and the like. Such an organic EL element can be made to emit light by making a potential difference between a pair of electrodes.

In an attempt to put the light emitting device into practical use, an extension of the life of the organic EL element is said to be an important issue. The deterioration of the organic layers over time causes a decrease in luminance of the organic EL element. The rate of deterioration over time depends on material properties, a sealing method, a driving method of the light emitting device, and the like. The organic layers are particularly susceptible to moisture, oxygen, light, and heat; therefore, these factors also promote the deterioration over time.

In addition, in an attempt for practical use, it is desired that the amount of current flowing through the organic EL element be constant regardless of temperature. Even if a voltage applied between the electrodes of the organic EL element is constant, the current flowing through the light emitting element increases as the temperature of the organic layer becomes higher. In other words, when the display device is driven with constant voltage, luminance change and chromaticity deviation occur in accordance with temperature change. For such a light emitting device including an organic EL element, a technique for maintaining constant luminance of the light emitting element regardless of ambient temperature is proposed (for example, see Reference 1: Japanese Published Patent Application No. 2002-333861).

SUMMARY OF THE INVENTION

It is an object of the present invention to provide a display device, in a part of which a monitor light emitting element is provided and in which an anode and a cathode of the monitor light emitting element are prevented from short-circuiting in an early stage and over time by using a circuit which corrects a voltage or a current to be supplied to a light emitting element in consideration of electrical property fluctuation of the monitor light emitting element, and a method for inspecting the display device.

In view of the above object, one aspect of the present invention is a display device that includes the above-described monitor light emitting element, and a circuit for electrically disconnecting the monitor light emitting element when an anode and a cathode of the monitor light emitting element are short-circuited in an early stage or over time. Another aspect of the display device is to further include a circuit for checking circuit operation before or after a step of providing the monitor light emitting element, and another aspect of the present invention is a method for inspecting the display device.

One feature of the display device of the present invention is to include a monitor light emitting element, a monitor line for supplying a current to the monitor light emitting element, a short interruption circuit for interrupting a current which is supplied through the monitor line to the monitor light emitting element when the monitor light emitting element is short-circuited, and a unit for inspecting the short interruption circuit. In addition, the above structure can further include a unit for supplying a constant current to the monitor line.

Another feature of the display device of the present invention is to include a monitor light emitting element, a monitor line for supplying a current to the monitor light emitting element, a unit for supplying a constant current to the monitor line, a short interruption circuit for interrupting a current which is supplied through the monitor line to the monitor light emitting element when the monitor light emitting element is short-circuited, and a monitor inspection power supply line which is connected to one electrode of the monitor light emitting element through a monitor inspection transistor, in which one of a source electrode and a drain electrode of the monitor inspection transistor is connected to the monitor inspection power supply line and the other is connected to the one electrode of the monitor light emitting element. Note that the phrase “being connected” herein can also mean “being electrically connected”. Therefore, it also includes a case where a semiconductor element, a switching element such as a transistor, or the like is provided between elements having a connection relationship. In this case, the elements having a connection relationship can be in a state where they are electrically connected to each other or a state where they are electrically disconnected from each other. For example, in a case where elements are connected to each other through a transistor, the elements are electrically connected to each other when the transistor is on, and the elements are electrically disconnected from each other when the transistor is off.

Another feature of the display device of the present invention is to include a monitor light emitting element, a monitor line for supplying a current to the monitor light emitting element, a unit for supplying a constant current to the monitor line, a monitor control transistor, a unit for turning off the monitor control transistor when the monitor light emitting element is short-circuited, and a monitor inspection power supply line which is connected to one electrode of the monitor light emitting element through a monitor inspection transistor, in which one of a source electrode and a drain electrode of the monitor control transistor is connected to the monitor line and the other is connected to the one electrode of the monitor light emitting element, and one of a source electrode and a drain electrode of the monitor inspection transistor is connected to the one electrode of the monitor light emitting element and the other is connected to the monitor inspection power supply line.

Another feature of the display device of the present invention is to include a monitor light emitting element, a monitor line for supplying a current to the monitor light emitting element, a unit for supplying a constant current to the monitor line, a monitor control transistor, a circuit including an input terminal and an output terminal, the input terminal of which is connected to one electrode of the monitor light emitting element and the output terminal of which is connected to a gate electrode of the monitor control transistor, and a monitor inspection power supply line which is connected to the one electrode of the monitor light emitting element through a monitor inspection transistor, in which one of a source electrode and a drain electrode of the monitor control transistor is connected to the monitor line and the other is connected to the one electrode of the monitor light emitting element, and one of a source electrode and a drain electrode of the monitor inspection transistor is connected to the monitor inspection power supply line and the other is connected to the one electrode of the monitor light emitting element.

Another feature of the display device of the present invention is to include a monitor light emitting element, a monitor control transistor, an inverter, and a monitor inspection transistor, in which one of a source electrode and a drain electrode of the monitor control transistor is connected to a monitor line for supplying a current to the monitor light emitting element, the other is connected to one electrode of the monitor light emitting element, and a gate electrode of the monitor control circuit is connected to an output terminal of the inverter; an input terminal of the inverter is connected to the other of the source electrode and the drain electrode of the monitor control transistor; and one of a source electrode and a drain electrode of the monitor inspection transistor is connected to a monitor inspection power supply line and the other is connected to the one electrode of the monitor light emitting element.

One feature of the method for inspecting a display device of the present invention is that the display device includes a monitor light emitting element, a monitor line for supplying a current to the monitor light emitting element, and a monitor inspection power supply line which is connected to one electrode of the monitor light emitting element through a switch, the method includes the step of inspecting a potential of the monitor line when the monitor inspection power supply line and the one electrode of the monitor light emitting element are connected to each other by turning on the switch.

Another feature of the method for inspecting a display device of the present invention is that the display device includes a monitor control transistor; a monitor line which is connected to one of a source electrode and a drain electrode of the monitor control transistor; an inverter, an output terminal of which is connected to a gate electrode of the monitor control transistor and an input terminal of which is connected to the other of the source electrode and the drain electrode of the monitor control transistor; and a monitor inspection power supply line which is connected to the other of the source electrode and the drain electrode of the monitor control transistor through a switch, the method includes the step of inspecting a potential of the monitor line when the monitor inspection power supply line and the other of the source electrode and the drain electrode of the monitor control transistor by turning on the switch.

A monitor light emitting element provided in a part of a display device and a circuit which corrects a voltage or a current to be supplied to a light emitting element in consideration of electrical property fluctuation of the monitor light emitting element can solve a defect caused by a short circuit in an early stage or over time between an anode and a cathode of the monitor light emitting element. Specifically, a monitor light emitting element and a circuit for electrically disconnecting the monitor light emitting element when an anode and a cathode of the monitor light emitting element are short-circuited can solve the defect caused by a short circuit in an early stage and over time between the anode and the cathode. In addition, a display device can be provided, which can surely solve a defect due to a short circuit by an inspection circuit for checking the operation of the circuit for electrically disconnecting the monitor light emitting element before and after a step of connecting the monitor light emitting element, and by a method for inspecting the inspection circuit.

DETAILED DESCRIPTION OF THE INVENTION

Figure 1:
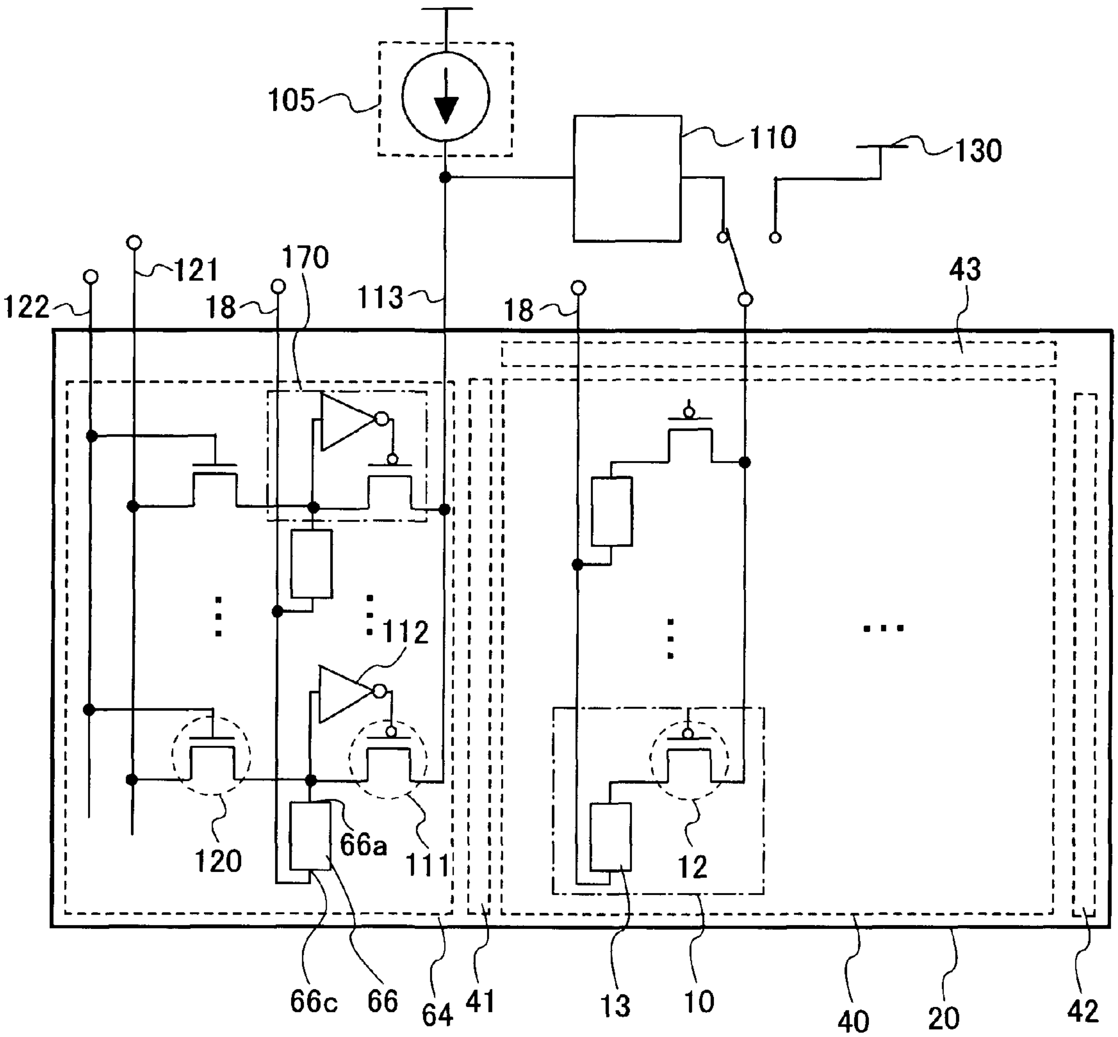
FIG. 1 is a diagram showing a display device of the present invention.

Embodiment modes of the present invention are hereinafter explained with reference to the drawings. However, the present invention can be implemented in many different modes, and it is to be easily understood by those skilled in the art that the mode and the detail of the present invention can be variously changed without departing from the spirit and the scope of the present invention. Therefore, the present invention is not interpreted as being limited to the description in the following embodiment modes. Note that in all of the drawings illustrating the embodiment modes, the same reference numeral is used to denote the same portion or a portion having a similar function, and repetitive explanation thereof is omitted.

Note that in this specification, connection between each element can also mean electrical connection. Therefore, there is a case where elements having a connection relationship are connected to each other through a semiconductor element, a switching element, or the like. This case may include a state where the elements are electrically connected to each other and a state where the elements are electrically disconnected from each other.

In this specification, the terms "source electrode" and "drain electrode" of a transistor are names adopted for convenience to distinguish between electrodes other than a gate electrode in the structure of the transistor. In a case where a structure of the present invention is not limited by polarity of the transistor, names for a source electrode and a drain electrode are changed in consideration of the polarity. Therefore, each of the source electrode and the drain electrode may be referred to as either one electrode or the other electrode.

Embodiment Mode 1

This embodiment mode explains a structure of a panel having a monitor light emitting element.

In FIG. 1, a pixel portion 40, a signal line driver circuit 43, a first scan line driver circuit 41, a second scan line driver circuit 42, and a monitor circuit 64 are provided over an insulating substrate 20.

The pixel portion 40 is provided with a plurality of pixels 10. Each pixel is provided with a light emitting element 13 and a transistor which is connected to the light emitting element 13 and functions to control the supply of current (hereinafter referred to as a "driving transistor 12"). The light emitting element 13 is connected to a power supply line 18. Note that an example of a more specific structure of the pixel 10 is given in an embodiment mode below.

The monitor circuit 64 includes a monitor light emitting element 66, a transistor connected to the monitor light emitting element 66 (hereinafter referred to as a "monitor control transistor 111"), a transistor connected to the monitor light emitting element 66 (hereinafter referred to as a "monitor inspection transistor 120"), and an inverter 112 an output terminal of which is connected to a gate electrode of the monitor control transistor 111 and an input terminal of which is connected to one electrode of the monitor control transistor 111 and the monitor light emitting element 66.

In addition, a constant current source 105 is connected to the monitor control transistor 111 through a monitor current line (hereinafter referred to as a "monitor line 113").

The monitor light emitting element 66 is connected to a drain electrode of the monitor inspection transistor 120; a wiring connected to a monitor inspection power source (hereinafter referred to as a "monitor inspection power supply line 121") to a source electrode thereof; and a monitor inspection transistor control line 122 is connected to a gate electrode thereof.

The monitor control transistor 111 functions to control current supply through the monitor line 113 to the monitor light emitting element 66.

The monitor inspection transistor 120 functions to apply to the monitor light emitting element 66 the same potential as that of the monitor inspection power supply line 121 connected to the monitor inspection power source when the transistor is turned on, and functions to electrically disconnect the monitor light emitting element and the monitor inspection power supply line 121 from each other when the transistor is turned off. In supplying a current to the monitor light emitting element 66, the monitor light emitting element 66 and the monitor inspection power supply line 121 are electrically disconnected from each other by controlling (turning off) the monitor inspection transistor 120.

The monitor line 113 is connected to an electrode of the monitor light emitting element 66; therefore, it can function to monitor a change in potential of the electrode.

It is acceptable as long as the constant current source 105 functions to supply a constant current to the monitor line 113.

The monitor light emitting element 66 and the light emitting element 13 are manufactured under the same manufacturing conditions and through the same process as each other, and thus they have the same structure. Therefore, the monitor light emitting element 66 and the light emitting element 13 have the same or almost the same characteristics with respect to a change in ambient temperature and deterioration over time. The monitor light emitting element 66 is connected to the power supply line 18. Here, a power supply line connected to the light emitting element 13 and a power supply line connected to the monitor light emitting element 66 have the same potential as each other by being connected to the same power source; therefore, each of them is denoted by the same reference numeral and is referred to as the power supply line 18.

Although explanation is given in this embodiment mode on the premise that the monitor control transistor 111 has n-channel type conductivity, the present invention is not limited thereto. The monitor control transistor may have n-channel type conductivity. In that case, configurations of peripheral circuits are changed appropriately.

Light from the monitor light emitting element 66 needs to be prevented from leaking out. Therefore, the monitor light emitting element 66 is provided with a light blocking film so as to have a structure with which light does not leak out.

Note that the position where the monitor circuit 64 is provided is not limited, and the monitor circuit 64 may be provided between the signal line driver circuit 43 and the pixel portion 40, or between the pixel portion 40 and the first scan line driver circuit 41 or the second scan line driver circuit 42.

A buffer amplifier circuit 110 is provided between the monitor circuit 64 and the pixel portion 40. The buffer amplifier circuit is a circuit having characteristics such as equality in potential of an input and an output, high input impedance, and high output current capacity. Thus, the configuration of a circuit that has such characteristics can be appropriately determined.

The buffer amplifier circuit 110 functions to change a voltage which is applied to the light emitting element 13 included in the pixel portion 40 in accordance with a change in potential of one electrode of the monitor light emitting element 66.

In the present invention, the constant current source 105 and the buffer amplifier circuit 110 may be provided over the same insulating substrate 20 or different substrates.

In the above structure, a constant current is supplied from the constant current source 105 to the monitor light emitting element 66 in a state where the monitor light emitting element 66 and the monitor inspection power supply line 121 are electrically disconnected from each other. When a change in ambient temperature or deterioration over time occurs in this state, the resistance of the monitor light emitting element 66 changes. For example, when deterioration over time occurs, the resistance of the monitor light emitting element 66 increases. Then, a potential difference between both ends of the monitor light emitting element 66 changes because the value of current supplied to the monitor light emitting element 66 is constant. Specifically, a potential difference between both electrodes of the monitor light emitting element 66 changes. At this time, the potential of the electrode connected to the constant current source 105 changes because the potential of the electrode connected to the power supply line

18 is fixed. This change in potential of the electrode is supplied to the buffer amplifier circuit 110 through the monitor line 113.

In other words, the change in potential of the above electrode is inputted to an input terminal of the buffer amplifier circuit 110. In addition, the potential outputted from an output terminal of the buffer amplifier circuit 110 is supplied to the light emitting element 13 through the driving transistor 12. Specifically, the outputted potential is applied as the potential of one electrode of the light emitting element 13.

In this manner, a change of the monitor light emitting element 66 in accordance with a change in ambient temperature and deterioration over time is supplied to the light emitting element 13. As a result, the light emitting element 13 can emit light with a luminance in accordance with the change in ambient light and the deterioration over time. Accordingly, a display device which can perform display regardless of a change in ambient temperature and deterioration over time can be provided.

Further, in a case where a plurality of monitor light emitting elements 66 is provided, an average of potential changes of these monitor light emitting elements can be supplied to the light emitting element 13. In other words, potential changes can be averaged when a plurality of monitor light emitting elements 66 is provided in the present invention, which is preferable.

Further, in the case where the plurality of monitor light emitting elements 66 is provided, a substitute for a monitor light emitting element where a short circuit or the like occurs can be prepared.

Further, a feature of the present invention is to provide the monitor control transistor 111 and the inverter 112 which are connected to the monitor light emitting element 66. These are provided in consideration of a malfunction of the monitor circuit 64, which is caused by a defect (including an initial defect and a defect over time) of the monitor light emitting element 66. For example, a case is considered in which the constant current source 105 and the monitor control transistor 111 are connected to each other without any other transistor or the like interposed therebetween and an anode and a cathode of one of the plurality of monitor light emitting elements 66 are short-circuited due to a defect in the manufacturing process or the like. Then, a large amount of current is supplied from the constant current source 105 to the short-circuited monitor light emitting element through the monitor line 113. The plurality of monitor light emitting light emitting elements is connected in parallel. Therefore, when a large amount of current is supplied to the short-circuited monitor light emitting element, a predetermined constant current is not supplied to the other monitor light emitting elements. As a result, an appropriate potential change of the monitor light emitting element 66 cannot be supplied to the light emitting element 13.

Such a short circuit of the monitor light emitting element is caused by potentials of the anode and the cathode of the monitor light emitting element becoming equal or close to each other. For example, the anode and the cathode may be short-circuited due to dust or the like therebetween in the manufacturing process. In addition, the monitor light emitting element may be short-circuited due to a short circuit between a scan line and the anode other than the short circuit between the anode and the cathode.

Thus, a short interruption circuit 170 is provided in the present invention. This short interruption circuit 170 includes the monitor control transistor 111 and the inverter 112. One feature of the monitor control transistor 111 is to stop current supply to a short-circuited monitor light emitting element, in other words, to electrically disconnect the short-circuited monitor light emitting element and the monitor line 113 from each other in order to prevent a large amount of current from being supplied due to the short circuit of the monitor light emitting element 66, and the like as described above.

The inverter 112 functions to output a potential for turning off the monitor control transistor 111 when any of the plurality of monitor light emitting elements 66 is short-circuited. In addition, the inverter 112 functions to output a potential for turning on the monitor control transistor when none of the plurality of monitor light emitting elements is short-circuited.

Although explanation is given in this embodiment mode on the premise that the monitor circuit 64 includes a plurality of monitor light emitting elements 66, monitor control transistors 111, and inverters 112, the present invention is not limited thereto. For example, any circuit may be used as the inverter 112 as long as, when a monitor light emitting element is short-circuited, it detects the short circuit and interrupts a current supplied through the monitor line 113 to the short-circuited monitor light emitting element. Specifically, it is acceptable as long as the circuit functions to turn off the monitor control transistor 111 in order to interrupt a current supplied to the short-circuited monitor light emitting element.

Before shipping the display device, it is necessary to confirm that circuits included in the display device operate normally. An inspection method thereof is explained taking as an example a structure in which the monitor circuit 64 includes a plurality of monitor light emitting elements 66 and short interruption circuits 170.

First, a defect in which the short interruption circuit 170 cannot supply a current to the normal monitor light emitting element 66 can be considered as a malfunction of the monitor circuit 64. In a case of a structure where the plurality of monitor light emitting elements 66 is provided, this defect does not cause a problem because monitor operation is conducted even when one of the short interruption circuits 170 has a defect. This is because the plurality of monitor light emitting elements 66 is provided, so that a substitute for the monitor light emitting element can be prepared even when the above-mentioned defect is generated. In addition, when a defect is generated in which a plurality of short interruption circuits 170 cannot supply a current to the normal monitor light emitting elements 66, the defect can easily be detected by inspecting the luminance of the display device before shipment or inspecting the potential of the monitor line 113, and then, a display device having the defect may be eliminated.

Next, a defect in which the supply of a large amount of current to the monitor light emitting element 66 of which an anode and a cathode are short-circuited cannot be interrupted can be considered as a malfunction of the monitor circuit 64. For example, considered is a case where one of the plurality of inverters 112 outputs a potential Vc of a negative power supply terminal of the inverter 112 regardless of a potential of an input terminal due to a defect in a manufacturing process, or the like. Causes for the generation of such a defect include, for example, a short circuit due to dust in a manufacturing process, or the like, defective contact, gate leakage, and the like.

When the short-circuited monitor light emitting element 66 is connected to the defective part as described above, a large amount of current flows to the monitor light emitting element 66. Therefore, a potential of an anode **66*a* becomes close to that of a cathode 66*c* and a potential of the monitor line 113 is also decreased, so that the luminance of the light emitting element 13** is decreased.

When there is such a defect, the defect can easily be detected by inspecting the luminance of the display device at the time of pre-shipment inspection or inspecting the potential of the monitor line 113. A display device having such a defect may be eliminated before shipment.

Next, considered is a case where the monitor light emitting element 66 is normal at the time of pre-shipment inspection and the short interruption circuit 170 has a defect in its ability to interrupt the supply of a large amount of current to the short-circuited monitor light emitting element. In this case, a desired current flows to the monitor light emitting element 66. Therefore, the defect cannot be detected by inspecting the luminance of the display device at the time of pre-shipment inspection or inspecting the potential of the power supply line 18. However, a short-circuit defect of the monitor light emitting element 66 may also be generated after shipment. Therefore, such a potential defect needs to be eliminated before shipment.

Thus, in the present invention, the monitor inspection transistor 120 connected to the monitor light emitting element 66 is provided in order to inspect the short interruption circuit 170. By controlling the potential of the monitor inspection transistor control line 122 connected to a gate electrode of the monitor inspection transistor 120, the monitor light emitting element 66 and the monitor inspection power supply line 121 can be electrically disconnected from each other or electrically connected to each other.

At the time of normal driving where a current is supplied to the monitor light emitting element 66, the monitor light emitting element 66 and the monitor inspection power supply line 121 are electrically disconnected from each other by turning off the monitor inspection transistor 120. On the other hand, at the time of inspecting the short interruption circuit 170 for inspecting a defect thereof, the monitor light emitting element 66 and the monitor inspection power supply line 121 are electrically connected to each other so as to have the same potential by turning on the monitor inspection transistor 120.

When the monitor inspection transistor 120 is turned on, the potential of the anode 66*a* of the monitor light emitting element 66 becomes equal to the potential of the monitor inspection power supply line 121. If the potential of the monitor inspection power supply line 121 is set to be equal to the potential of the cathode 66*c*, the potential of the anode 66*a* becomes equal to the potential of the cathode 66*c*. In other words, the same state as a state in which all the monitor light emitting elements 66 included in the monitor circuit 64 are short-circuited can be generated.

When all the short interruption circuits 170 are normal at the aforementioned time of inspecting the short interruption circuit, the output of each of the inverters 112 is at a potential Va_High of a positive power supply terminal. Therefore, the potential of the monitor line 113 is higher than Va_High.

On the contrary, when the output of at least one of the inverters 112 is not at the potential Va_High of the positive power supply terminal, all of the current supplied from the constant current source 105 flows to the monitor control transistor 111 which is connected to the inverter 112.

An inspection method using this circuit operation is explained next.

In the case of employing the above-described inspection method, the potential Va_High of the positive power supply terminal of the inverter 112 and the value of current supplied from the constant current source 105 need to be devised. Specifically, a potential higher than a potential when all of the current flowing through the monitor line 113 flows to one of the monitor light emitting elements 66 may be supplied to the positive power supply terminal of the inverter 112. Accordingly, when one of the short interruption circuits 170 has a defect, the potential of the monitor line 113 is lower than the potential Va_High of the positive power supply terminal of the inverter 112. On the other hand, when all of the short interruption circuits 170 are normal, the potential of the monitor line 113 is higher than the potential Va_High of the positive power supply terminal of the inverter 112.

By using the above-described inspection method, the defect in which the supply of a large amount of current to the short-circuited monitor light emitting element cannot be interrupted can be detected at the time of pre-shipment inspection. Accordingly, the monitor light emitting element which is short-circuited over time can be electrically disconnected by the circuit of which normal operation is confirmed. This makes it possible to eliminate a potential defect and to provide a display device with higher reliability.

Meanwhile, in measuring the potential of the monitor line 113, an input impedance of a probe is low in some cases depending on a structure of an inspection apparatus. In this case, the current from the constant current source 105 may flow to the probe of the inspection apparatus, so that accurate measurement cannot be performed. Thus, an analog buffer may be interposed and an output thereof may be observed as the potential of the monitor line 113.

Figure 10:
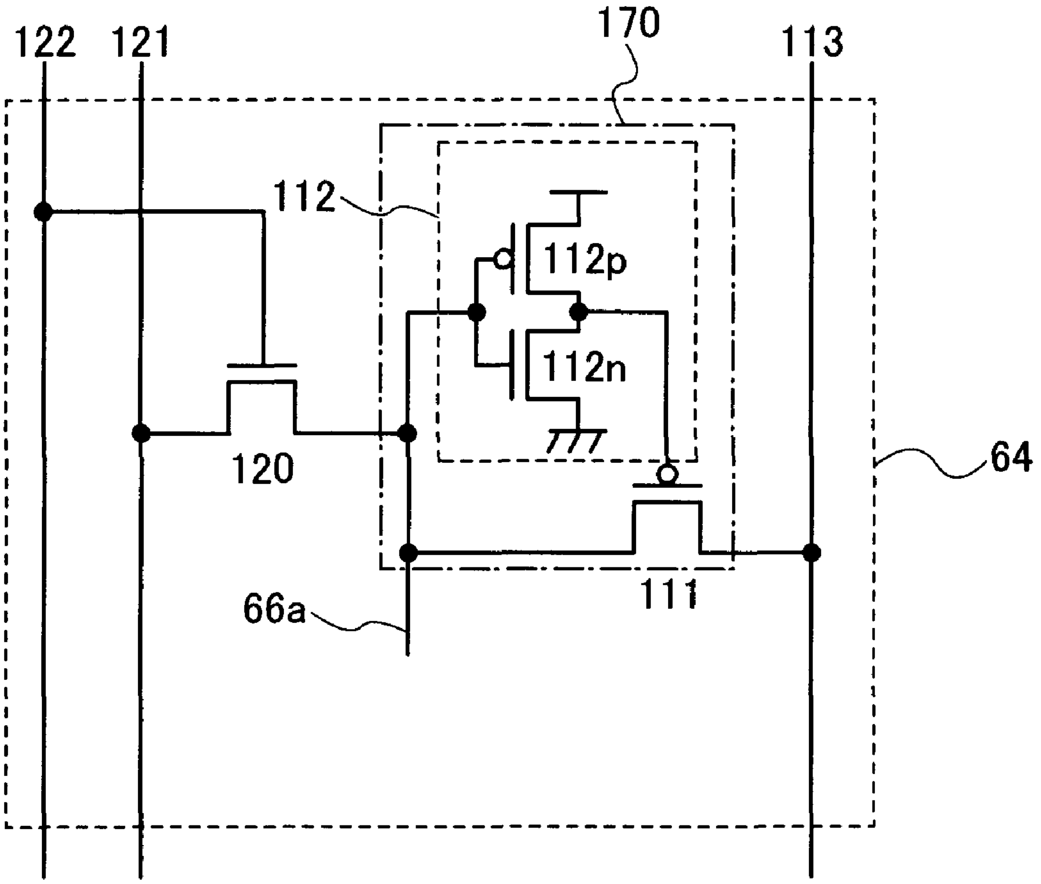
FIG. 10 is a diagram showing a monitor circuit of the present invention.

The malfunction of the monitor circuit 64 caused by the above-described defect of the short interruption circuit 170 can be inspected by a similar method even when the monitor light emitting element 66 is not provided as shown in FIG. 10. Accordingly, the monitor circuit 64 including the defective short interruption circuit 170 can be sorted out before forming the monitor light emitting element 66.

The monitor circuit 64 including the defective short interruption circuit 170 is eliminated. Therefore, even when a material of the monitor light emitting element 66 and the light emitting element is expensive or the step of forming the monitor light emitting element 66 and the light emitting element takes time, waste of the expensive material or the time necessary for the step can be reduced and cost can be reduced.

Further, it is also necessary to consider a case where the monitor inspection transistor 120 has a defect. First, when the defect is that one of the monitor inspection transistors 120 cannot electrically disconnect the monitor light emitting element 66 and the monitor inspection power supply line 121 from each other, the output of the inverter 112 is at a high-level potential and the monitor control transistor 111 is turned off by setting the potential of the monitor inspection power supply line 121 to be equal to the potential of the cathode 66*c* of the monitor light emitting element 66. This does not cause a problem because this is similar to when the monitor light emitting element 66 is short-circuited whereas the short interruption circuit 170 operates normally.

In addition, when the defect is that one of the monitor inspection transistors 120 cannot electrically disconnect the monitor light emitting element 66 and the monitor inspection power supply line 121 from each other, and in addition, that the short interruption circuit 170 cannot interrupt the supply of a large amount of current to the monitor light emitting element, the defect does not cause a problem because it can be detected by the above-described inspection method for inspecting the defect in which the supply of a large amount of current to the monitor light emitting element cannot be interrupted.

Furthermore, considered is a case where one of the monitor inspection transistors 120 has a defect in its ability to electrically connect the monitor light emitting element 66 and the monitor inspection power supply line 121 to each other, and in addition, the short interruption circuit 170 has a defect in its ability to interrupt the supply of a large amount of current to the monitor light emitting element. As for the above-described defect, the short interruption circuit 170 cannot be inspected when the monitor light emitting element 66 is not connected. This is because, even if the short interruption circuit 170 has a defect, there is no further destination of current flow, so that the above-described defect cannot be detected. On the contrary, the inspection is possible as described above when the monitor light emitting element 66 is connected.

Therefore, although the above-described defect is rare, it is preferable to take all possible measures by conducting inspection first in a state where the monitor light emitting element 66 is not provided and again later in a state where the monitor light emitting element 66 is connected.

In addition, as the monitor inspection transistor 120 of this embodiment mode, a transistor with as low off current as possible is preferably used. This is because, at the time of normal driving where a current is supplied to the monitor light emitting element 66, the current supplied from the constant current source 105 flows to not only the monitor light emitting element 66 but also the monitor inspection transistor 120. When the off current at this time is high, the accuracy of correction for the light emitting element 13 is deteriorated. Therefore, the lower the off current of the monitor inspection transistor 120 is, the more preferable it is. For example, it is preferable to use a TFT with an LDD (Lightly Doped Drain) structure, a multi-gate transistor, or the like.

As described above, the panel of this embodiment mode includes the plurality of monitor light emitting elements 66 and can correct luminance variations due to deterioration over time of the light emitting element or a change in ambient temperature by using a circuit which corrects a voltage or a current to be supplied to the light emitting element 13 in consideration of changes of the monitor light emitting elements 66. When the anode and the cathode of any of the plurality of monitor light emitting elements 66 are short-circuited, the luminance variations due to the deterioration over time of the light emitting element or the change in ambient temperature can be corrected in this embodiment mode by the short interruption circuit 170 which electrically disconnects the short-circuited monitor light emitting element. In this embodiment mode, the luminance variation due to the deterioration over time of the light emitting element or the change in ambient temperature can be corrected by the circuit which corrects a voltage or a current to be supplied to the light emitting element in consideration of the changes of the monitor light emitting elements even when a short circuit is generated not only in an early stage but also over time.

Further, since the short interruption circuit 170 which electrically disconnects the short-circuited monitor light emitting element can also be inspected before shipment, only a panel of which the monitor light emitting element 66 is confirmed to have no potential defect can be provided.

Embodiment Mode 2

Figure 5A:
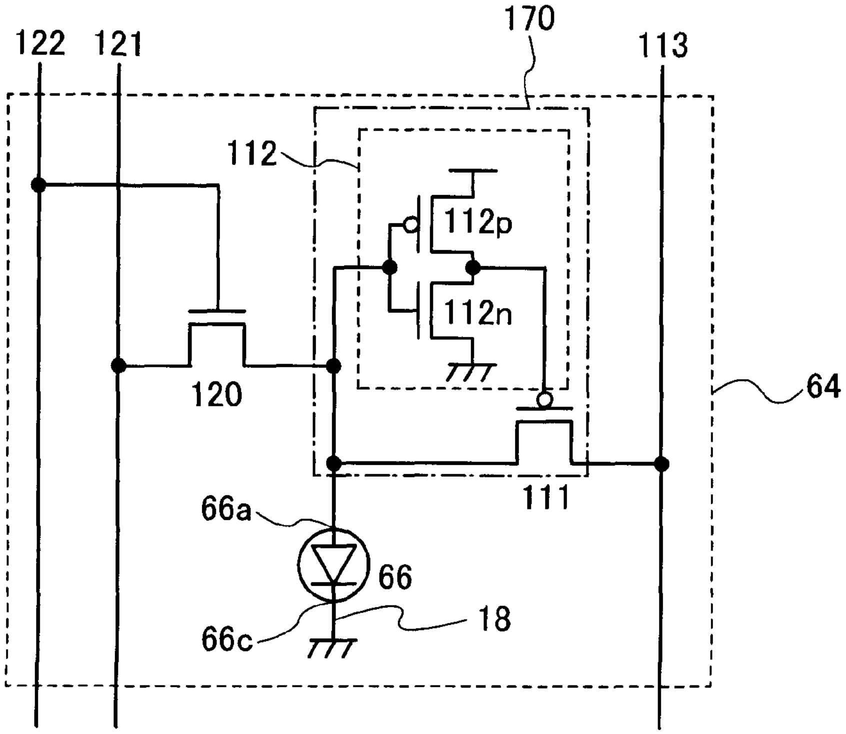
FIGS. 5A and 5B are diagrams showing a monitor circuit of the present invention and a timing chart thereof.
Figure 5B:
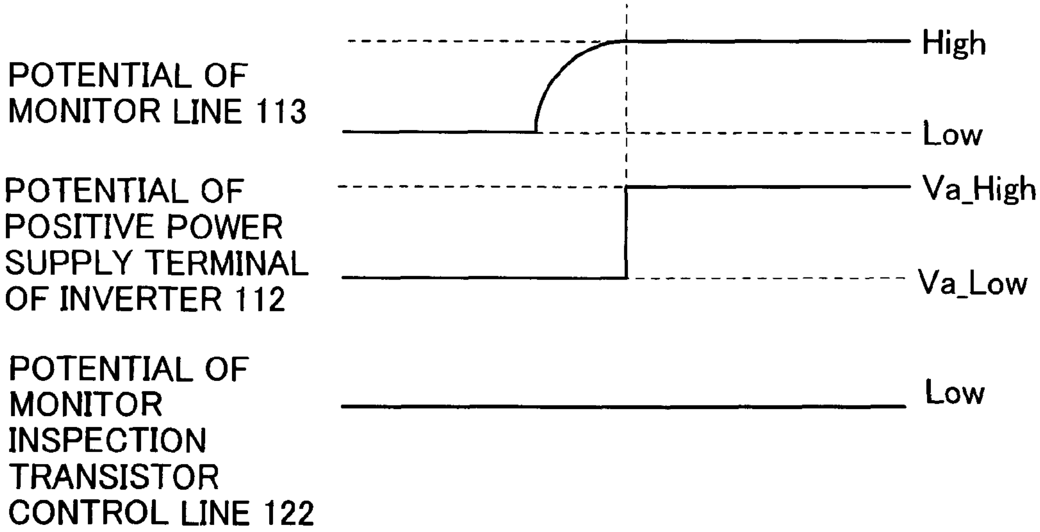

This embodiment mode explains in detail the operation of the monitor circuit 64 in Embodiment Mode 1, with reference to FIGS. 5A and 5B.

As shown in FIG. 5A, when an electrode with a high-level potential of electrodes of the monitor light emitting element 66 is the anode 66*a* and one with a low-level potential is the cathode 66*c*, the anode 66*a* is connected to an input terminal of the inverter 112, and the cathode 66*c* is connected to the power supply line 18, which is at a fixed potential. Therefore, when the anode and the cathode of the monitor light emitting element 66 are short-circuited, the potential of the anode 66*a* becomes close to the potential of the cathode 66*c*. As a result, the inverter 112 is supplied with a low potential which is close to the potential of the cathode 66*c*; therefore, a p-channel transistor 112*p* included in the inverter 112 is turned on. Then, the potential (Va_High) of the positive power supply terminal is outputted from the inverter 112, which is to be a gate potential of the monitor control transistor 111. In other words, the potential inputted to the gate of the monitor control transistor 111 is Va_High, so that the monitor control transistor 111 is turned off.

Note that the high-level potential (Va_High) of the positive power supply terminal of the inverter 112 is preferably set to be equal to the potential of the anode 66*a*. In addition, the potential Vc of the negative power supply terminal of the inverter 112, the potential of the power supply line 18, a low-level potential of the monitor line 113, and a low-level potential applied to Va can all be equal to one another. In general, the low-level potential is set to a ground potential. However, the present invention is not limited to this, and the low-level potential may be determined so as to have a predetermined potential difference with the high-level potential. The predetermined potential difference can be determined depending on current, voltage, and luminance characteristics of a light emitting material, or specification of a device.

Here, attention needs to be given to the order of making the constant current flow through the monitor light emitting element 66. The constant current needs to be started flowing to the monitor line 113 while the monitor control transistor 111 is on. Therefore, in this embodiment mode, a current is started flowing to the monitor line 113 while the potential of the positive power supply terminal of the inverter 112 is set to a low-level potential (Va_Low) as shown in FIG. 5B. At this time, a current can be supplied to all the monitor control transistors 111. Then, after the potential of the monitor line 113 reaches the saturation state, the potential of the positive power supply terminal of the inverter 112 is set to the potential Va_High which is equal to the potential of the anode 66*a*. At this time, High is inputted to the input terminal of the inverter 112 which is connected to the normal monitor light emitting element 66 with no short circuit. Accordingly, the monitor control transistor 111 is turned on. On the other hand, Low is inputted to the input terminal of the inverter 112 which is connected to the short-circuited monitor light emitting element 66. Accordingly, a current from the constant current source 105 can be prevented from being supplied to the short-circuited monitor light emitting element.

Accordingly, when a plurality of monitor light emitting elements is provided and one of them is short-circuited, a change in potential of the monitor line 113 can be minimized by interrupting the current supply to the short-circuited monitor light emitting element. As a result, the appropriate amount of change in potential of the monitor light emitting element 66 can be supplied to the light emitting element 13.

Note that, in this embodiment mode, it is acceptable as long as the constant current source 105 is a circuit that can supply a constant current, and for example, the constant current source 105 can be manufactured using a transistor.

Although explanation is given in this embodiment mode on the premise that the monitor circuit 64 includes the plurality of monitor light emitting elements 66, monitor control transistors 111, and inverters 112, the present invention is not limited thereto. For example, any circuit may be used as the inverter 112 as long as, when the monitor light emitting element is short-circuited, it detects the short circuit and interrupts a current supplied through the monitor line 113 to the short-circuited monitor light emitting element. Specifically, it is acceptable as long as the circuit functions to turn off the monitor control transistor in order to interrupt a current supplied to the short-circuited monitor light emitting element.

One feature of this embodiment mode is to use the plurality of monitor light emitting elements 66. Even if any of them becomes defective, monitor operation can be conducted, which is preferable. Further, monitor operations of the plurality of monitor light emitting elements can be averaged, which is preferable.

In this embodiment mode, the buffer amplifier circuit 110 is provided to prevent a potential change. Therefore, another circuit other than the buffer amplifier circuit 110 may be used as long as it can prevent a potential change like the buffer amplifier circuit 110. In other words, when a circuit for preventing a potential change in transmitting the potential of one electrode of the monitor light emitting element 66 to the light emitting element 13 is provided between the monitor light emitting element 66 and the light emitting element 13, the circuit is not limited to the buffer amplifier circuit 110, and a circuit having any configuration may be used.

As described above, when an anode and a cathode of any of the plurality of monitor light emitting elements 66 are short-circuited, the luminance change due to the deterioration over time of the light emitting element or the change in ambient temperature can be corrected in this embodiment mode by the short interruption circuit 170 which electrically disconnects the short-circuited monitor light emitting element. In this embodiment mode, the luminance change due to the deterioration over time of the light emitting element or the change in ambient temperature can be corrected by the circuit which corrects a voltage or a current to be supplied to the light emitting element in consideration of the change of the monitor light emitting element even when a short circuit is generated not only in an early stage but also over time.

Note that this embodiment mode can be implemented in free combination with the above embodiment mode.

Embodiment Mode 3

Figure 6:
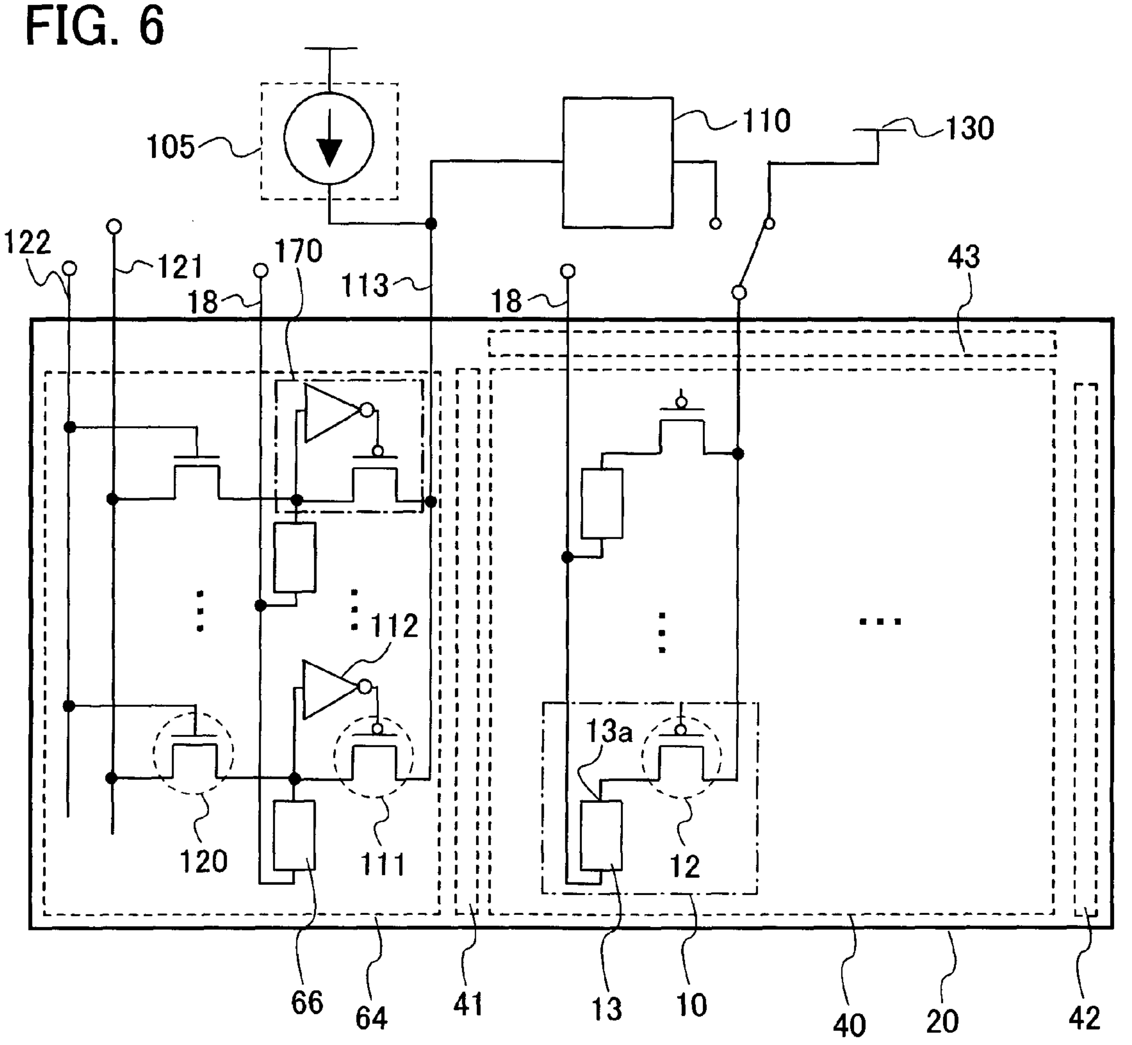
FIG. 6 is a diagram showing a monitor circuit of the present invention.
Figure 7A:
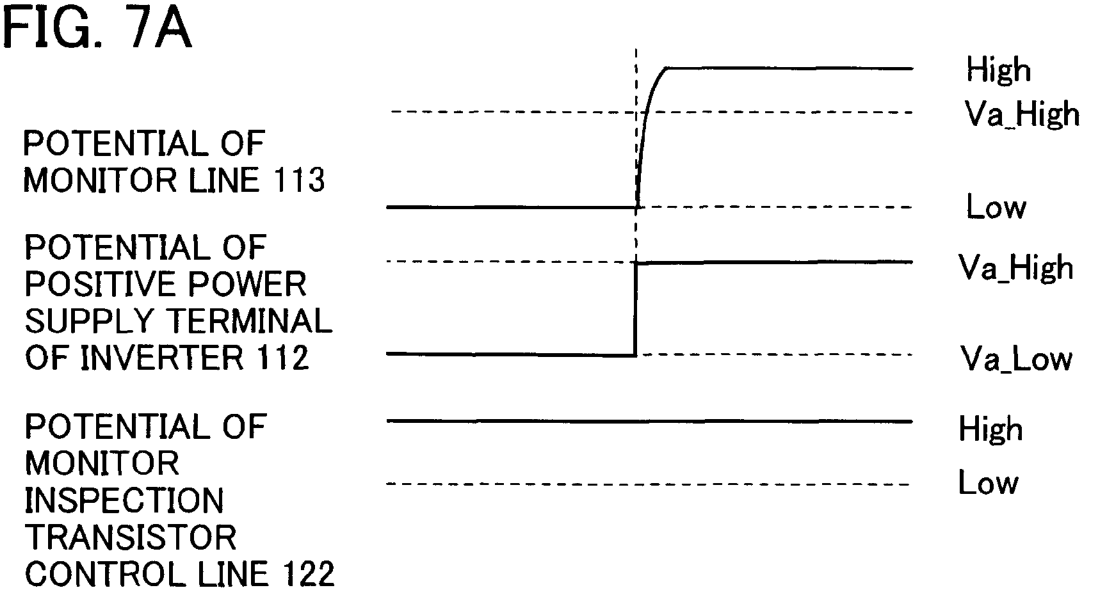
FIGS. 7A and 7B are diagrams showing timing charts of the present invention.
Figure 7B:
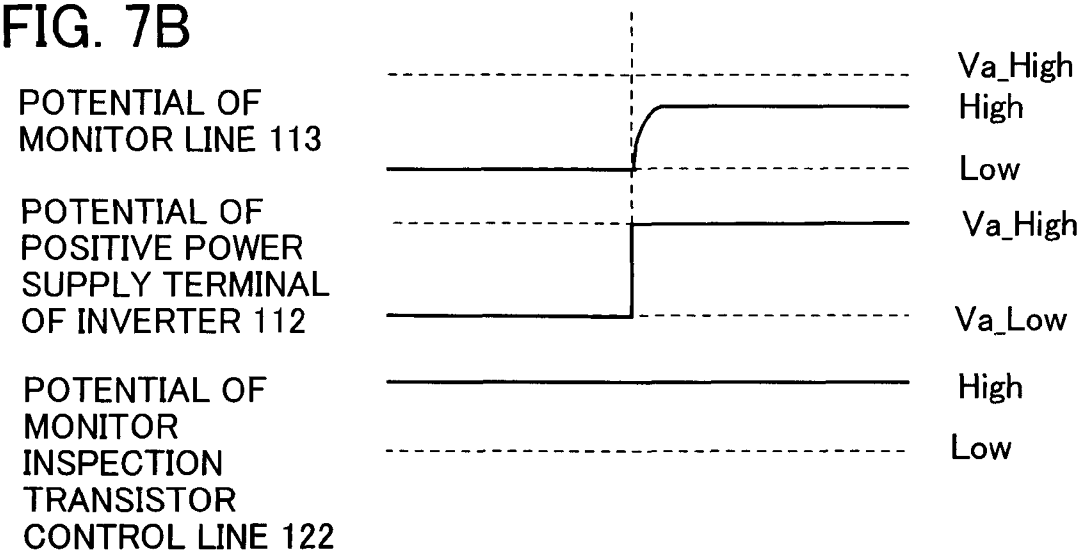

This embodiment mode explains in detail an inspection method by which a defect in which the supply of a large amount of current to a short-circuited monitor light emitting element cannot be interrupted can be detected before shipment, with reference to FIGS. 6 to 7B.

First, in a state where the potential of the anode 66*a* of the monitor light emitting element 66 is equal to the potential of the cathode 66*c*, the potential of the positive power supply terminal of the inverter 112 is set to Va_Low as shown in FIG. 7A and a current is made to flow through the monitor line 113. The constant current flowing through the monitor line 113 at this time needs to be devised as described in Embodiment Mode 1. Specifically, a current, with which a potential when all of the current flowing through the monitor line 113 flows to one of the monitor light emitting elements 66 becomes lower than the potential Va_High when the potential supplied to the positive power supply terminal of the inverter 112 is set to High, may be supplied. This is so that the potential of the monitor line 113 becomes lower than the potential Va_High which is supplied from the output of the inverter 112 to the positive power supply terminal when one of the short interruption circuits 170 has a defect.

After the potential of the monitor line 113 reaches the saturation state, the potential supplied to the positive power supply terminal of the inverter 112 is set to Va_High. The potential (Va_High) supplied to the positive power supply terminal of the inverter 112 at this time is supplied by an inspection power source 130 which supplies a constant potential regardless of the potential of the monitor line 113.

FIG. 6 shows a mode in the case where the high-level potential Va_High supplied to the positive power supply terminal of the inverter 112 is the same as the potential of an anode 13*a* of the light emitting element 13. At the time of inspecting the short interruption circuit, the potential (Va_High) supplied to the positive power supply terminal of the inverter 112 is supplied by the inspection power source 130 which supplies a constant potential regardless of the potential of the monitor line 113, as described above. In order to realize this, at the time of inspecting the monitor circuit 64, the positive power supply terminal of the inverter 112 and the anode 13*a* of the light emitting element 13 may be electrically disconnected from the buffer amplifier circuit 110, and instead, the inspection power source 130 and the anode 13*a* may be electrically connected to each other.

In this embodiment mode, when all of the short interruption circuits 170 included in the monitor circuit 64 are normal at the time of inspecting the short interruption circuits, outputs of all of the inverters 112 are at the potential (Va_High) of the positive power supply terminal. In addition, the potential of the monitor line 113 is higher than the potential (Va_High) of the positive power supply terminal of the inverter 112 as shown in FIG. 7A.

On the other hand, in the case of a defect in which at least one of the short interruption circuits 170 cannot interrupt the supply of a large amount of current to the monitor light emitting element, the potential of the monitor line 113 is lower than the potential (Va_High) of the positive power supply terminal of the inverter 112.

By measuring the potential of the monitor line 113 in this manner, the monitor circuit 64, which includes a potential defect in which the monitor light emitting elements 66 are normal at the time of inspection but the supply of a large amount of current to a short-circuited monitor light emitting element cannot be interrupted, can be sorted out at the time of inspection.

Since the short interruption circuit 170 which electrically disconnects the short-circuited monitor light emitting element can be inspected before shipment as described above in this embodiment mode, only a panel of which the monitor light emitting element 66 is confirmed to have no potential defect can be provided.

Note that this embodiment mode can be implemented in free combination with the above embodiment modes.

Embodiment Mode 4

Figure 8:
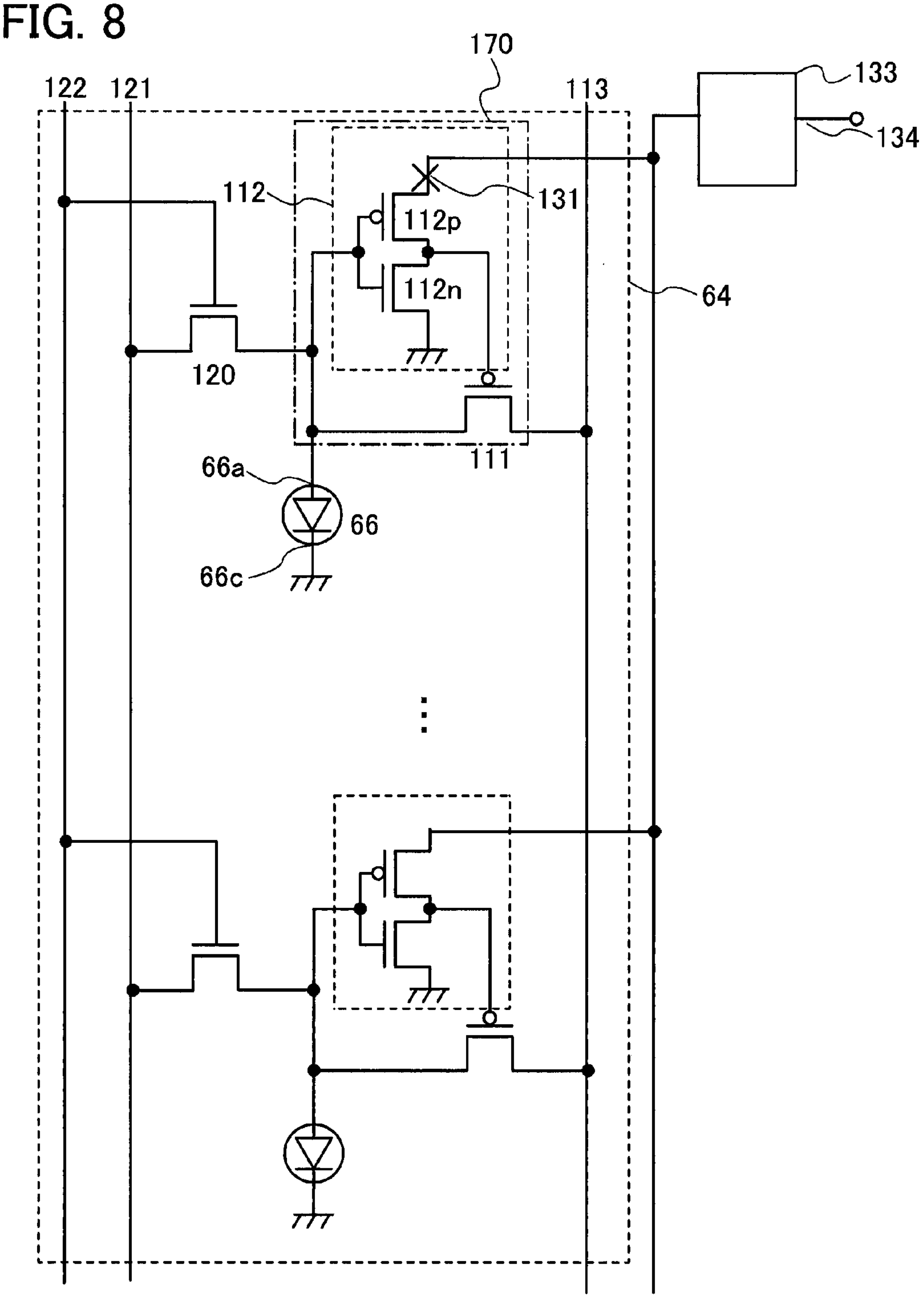
FIG. 8 is a diagram showing a monitor circuit of the present invention.
Figure 9A:
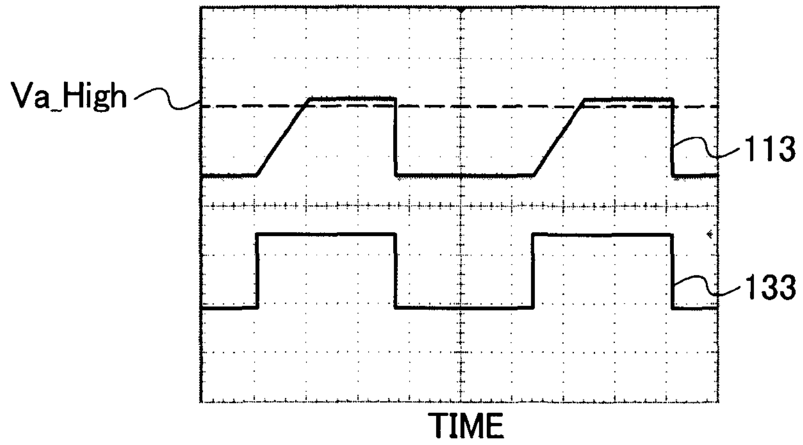
FIGS. 9A to 9C are diagrams showing timing charts of the present invention.
Figure 9B:
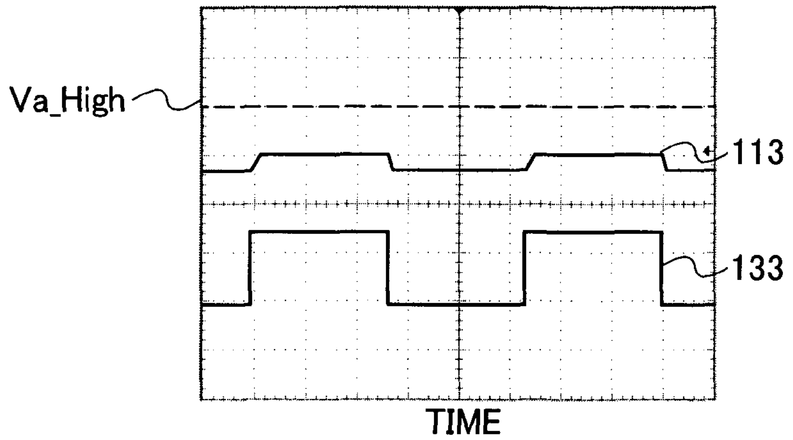
Figure 9C:
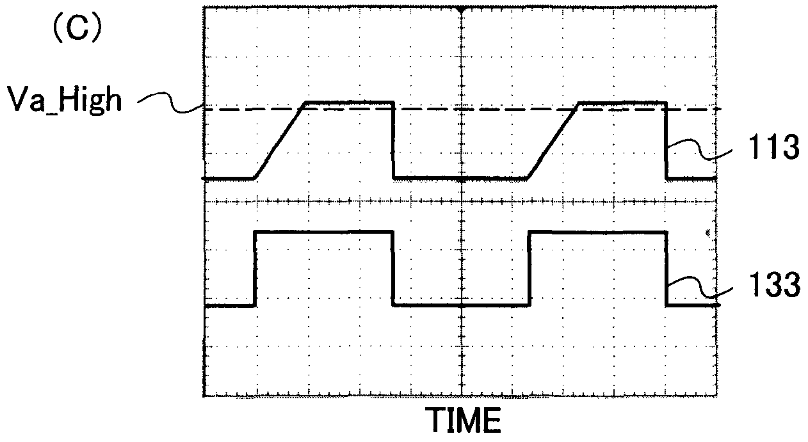

This embodiment mode explains verification results of the above-described inspection method, which is conducted using an actual prototype, with reference to FIGS. 8 to 9C.

The positive power supply terminal of the inverter 112 of the monitor circuit 64 used for verification is connected to an output of a level shifter circuit 133. The level shifter circuit 133 is a circuit which converts a low-voltage signal inputted from an input signal line 134 into a high-voltage signal and outputs the converted signal. This level shifter circuit 133 supplies two kinds of potentials, Va_High and Va_Low, to the positive power supply terminal of the inverter 112.

FIG. 9A shows an inspection result of the monitor circuit 64 without a defect. At this time, a constant current was constantly supplied to the monitor line 113, and a high-level potential of the level shifter circuit 133 was set to Va_High, and a potential of the monitor inspection power supply line 121 was set to be equal to a potential of the cathode 66*c*. Since the inspected monitor circuit 64 was normal, it could be confirmed that the potential of the monitor line 113 was higher than the potential (Va_High) of the positive power supply terminal of the inverter 112 when the input signal line 134 was at High.

Next, the positive power supply terminal of one of the plurality of inverters 112 included in the monitor circuit 64 which is confirmed to be normal was electrically disconnected using a laser. In this embodiment mode, the inverter 112 was electrically disconnected at a laser cutting position 131 in FIG. 8. Accordingly, the positive power supply terminal of the above-described inverter was electrically disconnected, and always outputs the potential Vc of the negative power supply terminal. FIG. 9B shows the potential of the input signal line 134 and the potential of the monitor line 113 at this time. It could be confirmed that the potential of the monitor line 113 was lower than the potential Va_High of the positive power supply terminal of the inverter 112 when the input signal line 134 was at High because the inspected monitor circuit 64 was abnormal.

As a result of the above-described verification, it is found that a defect of the monitor circuit 64 in which a current to the monitor light emitting element cannot be interrupted can be detected by the above inspection method. In addition, by the above-described inspection method, circuits for interrupting a current to a plurality of monitor light emitting elements can be inspected at the same time, and even when at least one of them has a defect, the defect can be detected. Therefore, an inspection step does not take time.

The short interruption circuit 170 which electrically disconnects the short-circuited monitor light emitting element can be inspected before shipment as described above in this embodiment mode. Therefore, only a panel of which the monitor light emitting element 66 is confirmed to have no potential defect can be provided.

Note that this embodiment mode can be implemented in free combination with the above embodiment modes.

Embodiment Mode 5

This embodiment mode explains a circuit configuration for electrically disconnecting or connecting the monitor light emitting element 66 and the monitor inspection power supply line 121 from or to each other and operation thereof, which are different from those described in the above embodiment modes.

Figure 11:
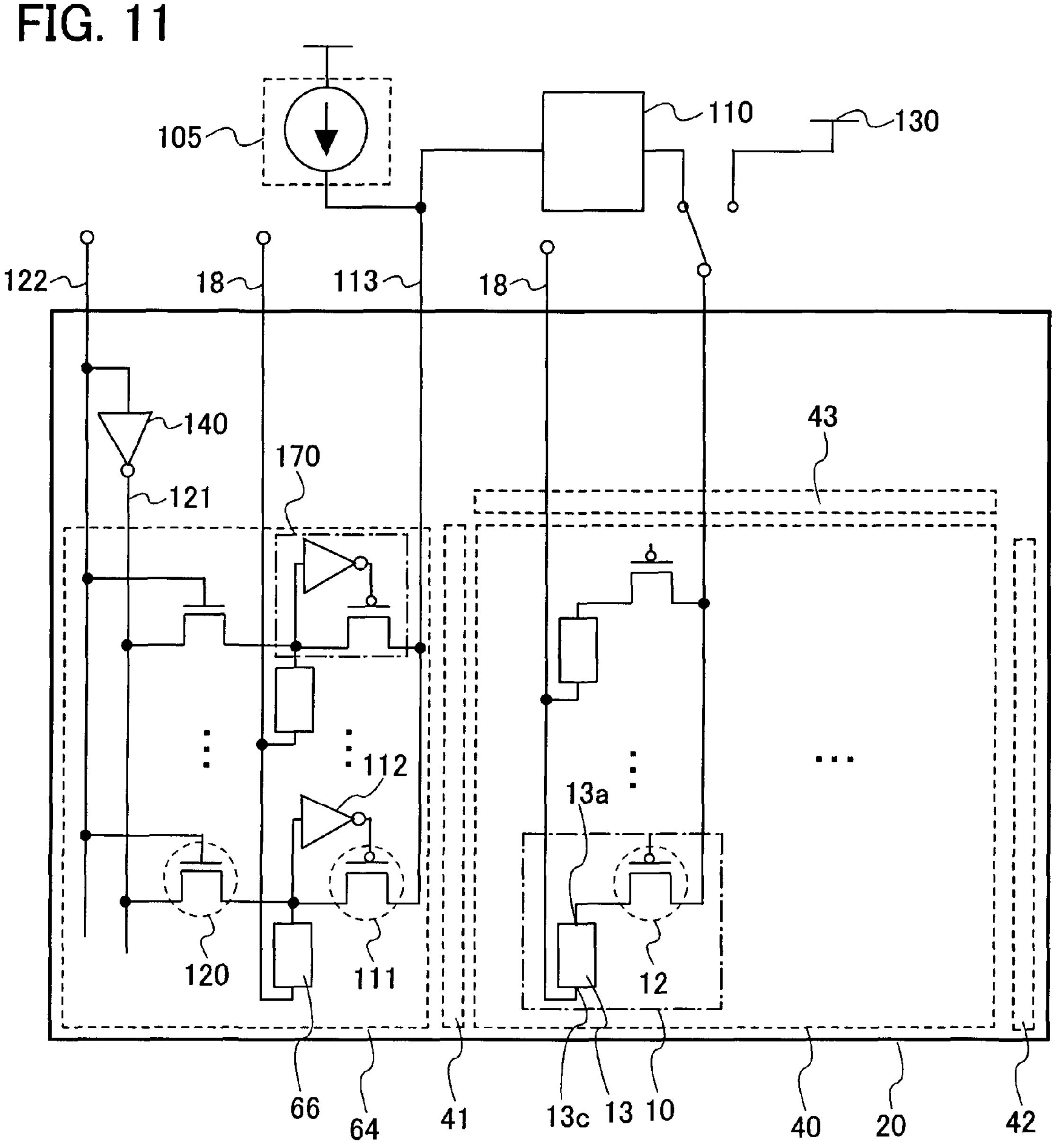
FIG. 11 is a diagram showing a monitor circuit of the present invention.

In the monitor circuit 64 shown in FIG. 11, the monitor inspection power supply line 121 connected to the monitor inspection transistor 120 is connected to a monitor inspection inverter 140, and an input of the monitor inspection inverter 140 is connected to a monitor inspection transistor control line 122 of the monitor inspection transistor 120. As a potential Va_High of a positive power supply terminal of the monitor inspection inverter 140, a potential equal to the potential of the anode 13*a* of the light emitting element 13 is preferably supplied. As a potential Vc of a negative power supply terminal of the monitor inspection inverter 140, a potential equal to the potential of the cathode 13*c* of the light emitting element 13 is preferably supplied. The potential Va_High of the positive power supply terminal of the monitor inspection inverter 140 does not necessarily need to be equal to the potential of the anode 13*a* of the light emitting element 13, and it is acceptable as long as it is higher than a gate potential of the monitor inspection transistor 120 and close to the potential of the anode 13*a* of the light emitting element 13. The other components are the same as those in the monitor circuit 64 shown in FIG. 1.

In this structure, a potential difference between the monitor inspection power supply line 121 and the monitor line 113 can be reduced when electrically disconnecting the monitor light emitting element 66 and the monitor inspection power supply line 121 from each other (at the time of normal driving). Accordingly, the amount of leakage current flowing from the monitor inspection transistor 120 to the monitor light emitting element 66 can be reduced. As a result, at the time of normal driving, the potential of the monitor line 113 can be monitored more accurately, which enables more accurate correction.

At the time of inspecting the monitor circuit, inspection similar to that in Embodiment Mode 1 may be conducted. Also in this embodiment mode, inspection is preferably conducted both in a state where the monitor light emitting element 66 is not connected and in a state where the monitor light emitting element 66 is connected.

The short interruption circuit 170 which electrically disconnects the short-circuited monitor light emitting element can be inspected before shipment as described above in this embodiment mode. Therefore, only a panel of which the monitor light emitting element 66 is confirmed to have no potential defect can be provided. Further, since the amount of leakage current flowing from the monitor inspection transistor 120 to the monitor light emitting element 66 can be reduced at the time of normal driving, the short interruption circuit 170 can be inspected without decreasing the accuracy of correction operation at the time of normal driving.

Note that this embodiment mode can be implemented in free combination with the above embodiment modes.

Embodiment Mode 6

This embodiment mode explains a circuit configuration for supplying a change of the monitor light emitting element 66 in accordance with a change in ambient temperature or deterioration over time to the light emitting element 13 and operation thereof, which are different from those in the above embodiment modes.

In the above embodiment modes, a constant current is constantly supplied to the monitor light emitting element 66. On the other hand, the light emitting element 13 is repeatedly turned on and off as needed. Accordingly, when a comparison in deterioration over time between them is made, the monitor light emitting element 66 changes faster. In order to make more accurate correction for deterioration over time, a rate at which characteristics of the monitor light emitting element 66 changes needs to be adjusted to some extent to a rate at which characteristics of the light emitting element 13 changes.

Figure 12:
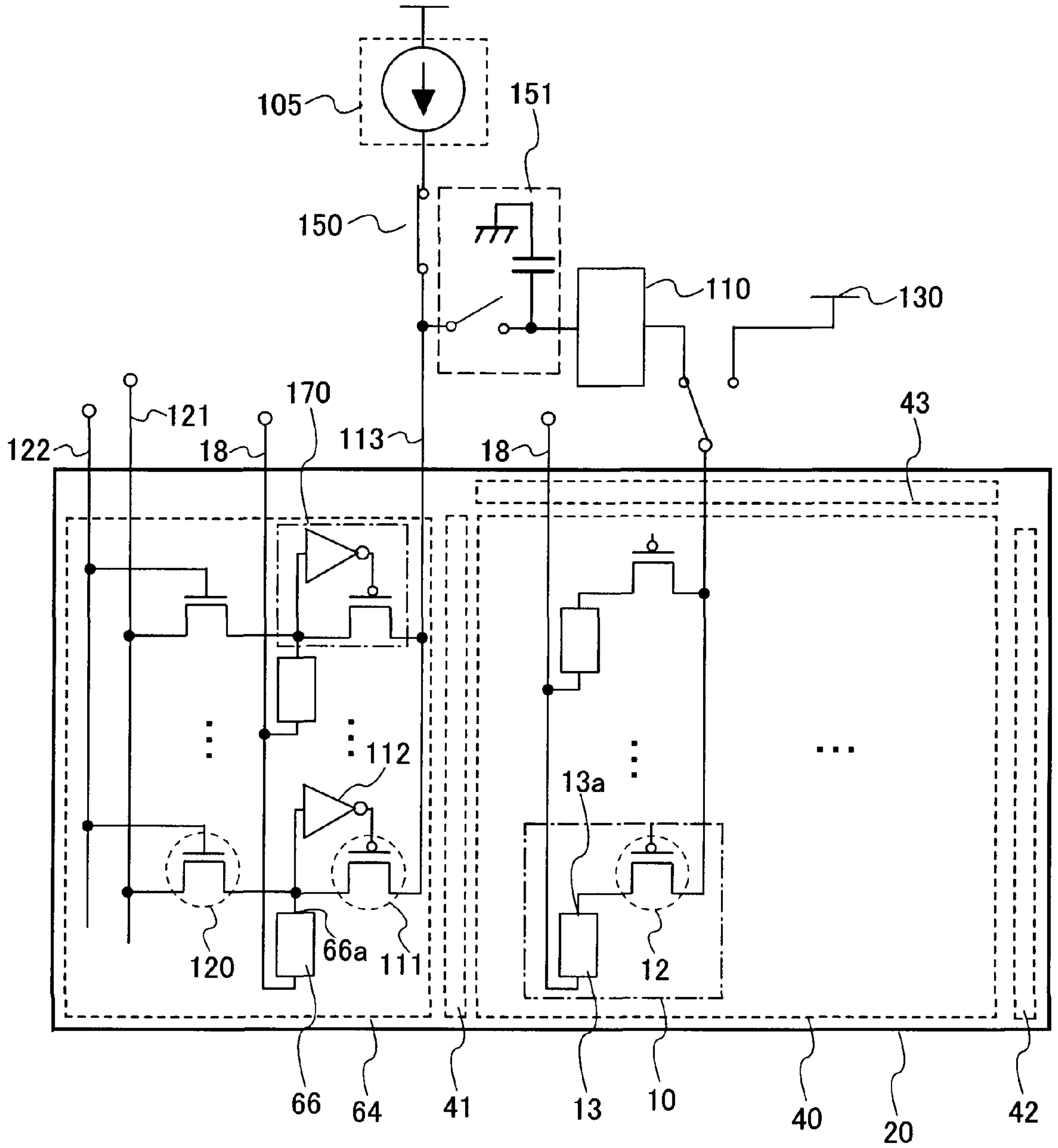
FIG. 12 is a diagram showing a monitor circuit of the present invention.

The above-described circuit configuration is explained with reference to FIG. 12. A monitor control switch 150 is connected between the monitor line 113 and the constant current source 105. In addition, a sample hold circuit 151 is connected between the monitor line 113 and the buffer amplifier circuit 110. The other components are the same as those in the monitor circuit 64 shown in FIG. 1.

The monitor control switch 150 can control the supply and interruption of a current to the monitor light emitting element 66. This is provided to adjust the deterioration rate of the monitor light emitting element 66 to that of the light emitting element 13 to some extent.

The sample hold circuit 151 holds the potential of the anode 66*a* of the monitor light emitting element 66 shortly before turning off the monitor light emitting element 66, even during a period in which the monitor light emitting element 66 is off. This is provided to make the light emitting element 13 emit light even during a period in which the monitor light emitting element 66 is off.

Figure 13:
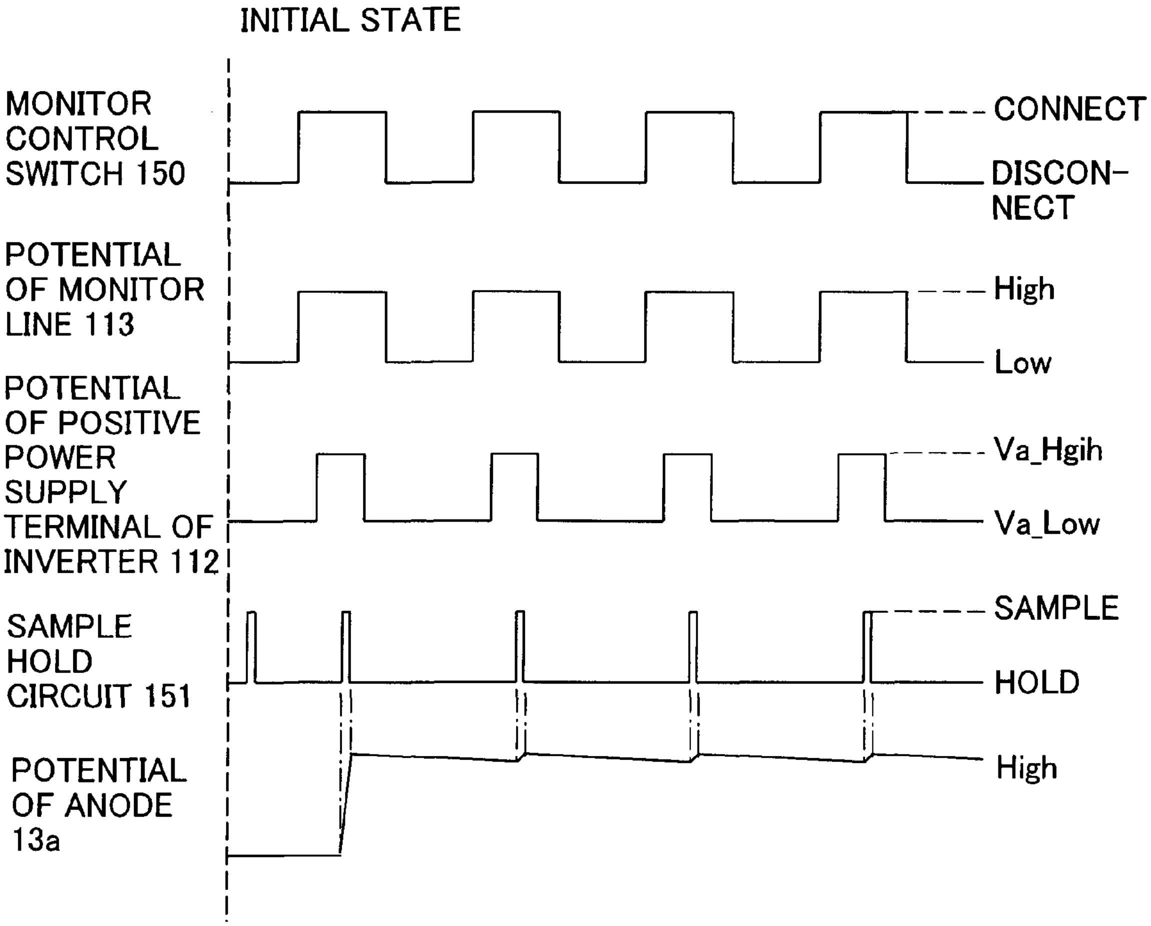
FIG. 13 is a diagram showing a timing chart of the present invention.

The circuit operation of this embodiment mode is explained with reference to a timing chart of FIG. 13. First, in an initial state, a current is started flowing through the monitor line 113 with the potential of the positive power supply terminal of the inverter 112 set to Va_Low as shown in FIG. 13. At this time, a current can be supplied to all of the monitor control transistors 111. Then, after the potential of the monitor line 113 reaches the saturation state, the positive power supply terminal of the inverter 112 is set to the potential (Va_High) which is equal to the potential of the anode 13*a* of the light emitting element 13. At this time, High is inputted to the input terminal of the inverter 112 which is connected to the normal monitor light emitting element 66 with no short circuit. Accordingly, the monitor control transistor 111 is turned on. On the contrary, Low is inputted to the input terminal of the inverter 112 which is connected to the short-circuited monitor light emitting element 66. Accordingly, a current from the constant current source 105 can be prevented from being supplied to the short-circuited monitor light emitting element.

After that, the sample hold circuit 151 samples the potential of the monitor line 113 and then holds the potential. As a result, only a potential in a state where a current from the constant current source 105 is supplied to only the normal monitor light emitting element 66 can be supplied to the anode 66*a*. Accordingly, the appropriate amount of change in potential of the monitor light emitting element 66 can be supplied to the light emitting element 13.

During a period in which the sample hold circuit 151 holds the above-described potential, the potential is constantly supplied to the anode 66*a*. Therefore, since the monitor light emitting element 66 can be turned off during this period, a lighting rate thereof can be freely set.

After the monitor light emitting element 66 in an off state is turned on again in a similar manner, the sample hold circuit 151 samples and holds the potential of the monitor line 113, which is repeated.

A typical feature of an output potential of the sample hold circuit 151 is to deteriorate over time. Therefore, in a case of supplying the potential of the monitor line 113 to the light emitting element 13 of a display device as in this embodiment mode, attention is needed because the deterioration over time results in decrease in luminance of the light emitting element 13.

In order to suppress the deterioration over time of the output potential of the sample hold circuit 151, an intervening period between sample periods needs to be short. Human eyes can perceive even a slight change in luminance. Therefore, the length of the intervening period between sample periods is preferably 16.6 ms or less. Accordingly, even when a slight decrease in luminance is generated, it becomes hard for human eyes to perceive. On the other hand, when the length of the intervening period between sample periods is longer than this, human eyes perceive the change as flicker.

Moreover, when the monitor light emitting element 66 and the light emitting element 13 are connected to the common power supply line 18, more accurate correction can be conducted by devising the timing of the sample period.

The number of the light emitting elements 13 to be turned on changes depending on a display image of a display device. Therefore, a current supplied through the power supply line 18 varies depending on a display image. Accordingly, an increase in potential of the power supply line 18 takes different values in accordance with display. Therefore, when the monitor light emitting element 66 is also connected to this power supply line 18, the potential of the monitor line may change in accordance with a display image and display may be adversely affected even when a constant current is supplied from the constant current source 105.

In order to solve this problem, the sample period is preferably provided during a period in which all the light emitting elements 13 are off. By supplying a constant current from the constant current source 105 during the period in which all the light emitting elements 13 are off, the current supplied through the power supply line 18 is only the current flowing through the monitor light emitting element 66. Thus, the potential of the monitor line 113 does not vary depending on a display image.

The above-described state in which all the light emitting elements 13 are off may be provided at least once in a frame period of 16.6 ms or less.

The lighting rate of the monitor light emitting element 66 is preferably set in accordance with use of the display device. For example, in the case of a display device which mainly displays white characters on a black background, a mean value of lighting rates of the plurality of light emitting elements 13 in a certain period is small, so that the lighting rate of the monitor light emitting element 66 is also preferably set low so as to be close thereto. On the contrary, in the case of a display device which displays black characters on a white background, a mean value of lighting rates of the plurality of light emitting elements 13 in a certain period is large, so that the lighting rate of the monitor light emitting element 66 is also preferably set high so as to be close thereto.

The lighting rate of the monitor light emitting element 66 may be set in accordance with a mean value of lighting rates of the plurality of light emitting elements 13 of the display device in a certain period. The mean value of lighting rates of the plurality of light emitting elements 13 of the display device in a certain period can be calculated from an input signal or the values of current flowing through the light emitting elements 13. The monitor light emitting element 66 may be driven at a lighting rate in accordance with the above mean value.

As described above, a panel of this embodiment mode includes the plurality of monitor light emitting elements 66 and can correct a luminance change due to deterioration over time of the light emitting element or a change in ambient temperature by using a circuit which corrects a voltage or a current to be supplied to the light emitting element 13 in consideration of a change of the monitor light emitting element 66. When an anode and a cathode of any of the plurality of monitor light emitting elements 66 are short-circuited, the luminance change due to the deterioration over time of the light emitting element or the change in ambient temperature can be corrected in this embodiment mode by the short interruption circuit 170 which electrically disconnects the short-circuited monitor light emitting element.

In this embodiment mode, the luminance change due to the deterioration over time of the light emitting element or the change in ambient temperature can be corrected by the circuit which corrects a voltage or a current to be supplied to the light emitting element in consideration of the change of the monitor light emitting element even when a short circuit is generated not only in an early stage but also over time.

Further, since the lighting rate of the monitor light emitting element 66 can be freely set, more accurate correction can be conducted.

Note that this embodiment mode can be implemented in free combination with the above embodiment modes.

Embodiment Mode 7

This embodiment mode explains a circuit configuration of a display device and operation thereof, which are different from those in the above embodiment modes.

Many display devices have the ability to allow a user to set the luminance of a display region. In addition, some display devices have the ability to adjust luminance in accordance with luminance around the display device or the ability to conduct high-luminance display for a certain period and then switch the display to low-luminance display in order to reduce power consumption.

Although a constant amount of current is constantly supplied to the monitor light emitting element 66 in each of the above embodiment modes, the luminance of the light emitting element 13 can be adjusted by changing the value of current. However, in the structure explained in Embodiment Mode 6, a malfunction may be caused when rapidly changing the high-luminance display into low-luminance display.

This embodiment mode explains a display device in which the potential of the anode 13*a* of the light emitting element 13 is rapidly changed from a high potential High1 into a low potential High2.

Figure 15:
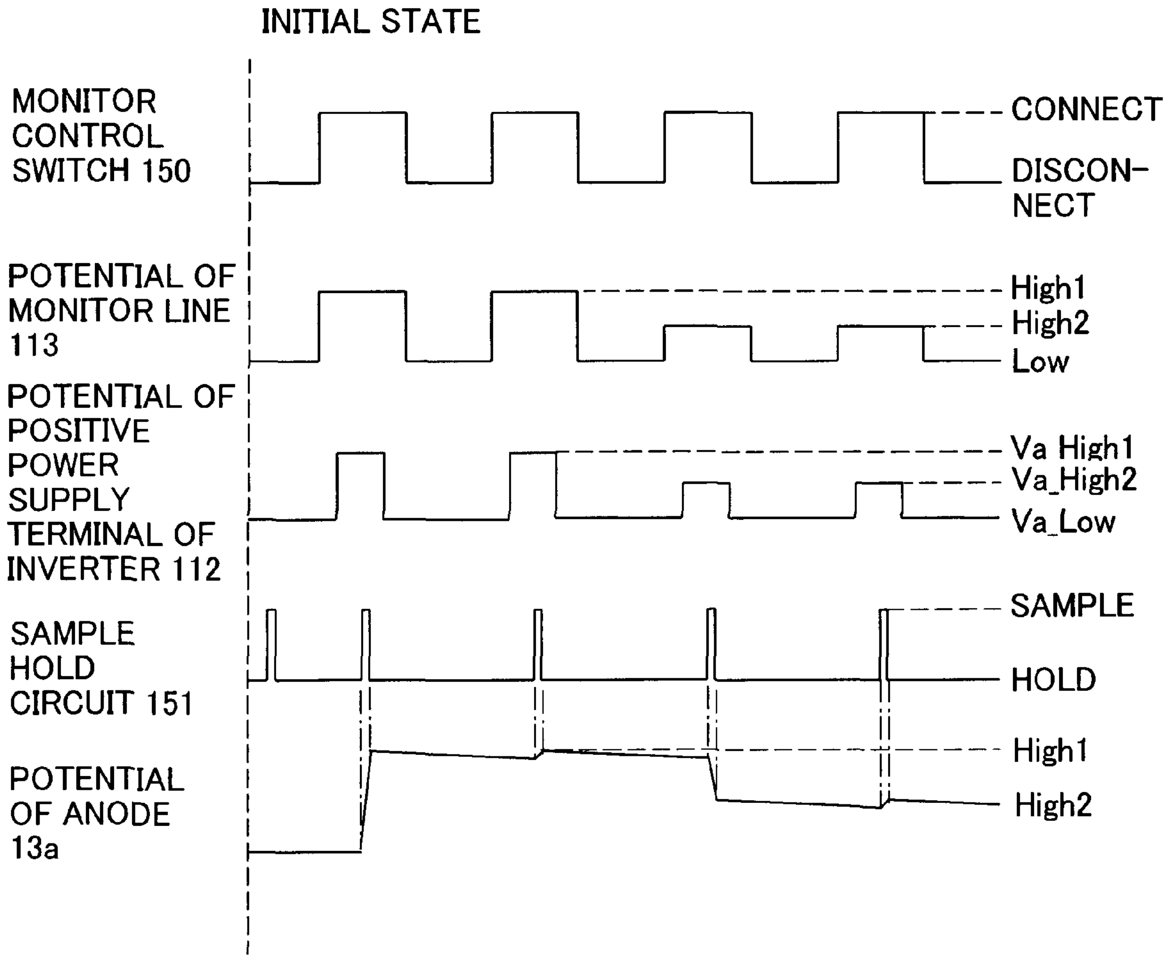
FIG. 15 is a diagram showing a timing chart of the present invention.

First, the above-described malfunction is explained with reference to FIG. 15. In a period in FIG. 15 in which the potential of the anode 13*a* of the light emitting element 13 is switched from High1 to High2, high-luminance display is rapidly changed into low-luminance display. In Embodiment Mode 6, the potential Va_High of the positive power supply terminal of the inverter and the potential of the anode 13*a* of the light emitting element 13 are the same. Therefore, during a period from a period in which the monitor line is at High2 to a period in which the sample hold circuit 151 is in a sample period, the potential of the monitor line 113 is lower than the potential Va_High of the positive power supply terminal of the inverter.

Therefore, an intermediate potential is inputted to the input terminal of the inverter 112. At this time, the output potential of the inverter 112 may be High depending on characteristics of a TFT included in the inverter 112. When the above-described output potential is applied to the gate terminal of the monitor control transistor 111, the potential of the monitor line 113 is higher than the potential Va_High of the positive power supply terminal of the inverter. After that, the sample hold circuit 151 samples the above-described potential of the monitor line 113 in the sample period and supplies the potential to the anode 66*a*. As a result, the potential of the anode 13*a* of the light emitting element 13 becomes higher than Va_High. Once the malfunction as described above is caused, the potential of the anode 66*a* is increased each time the sample hold circuit 151 repeats the sample period. As a result, due to the malfunction, the luminance of the light emitting element 13 becomes very high.

This embodiment mode explains a circuit configuration of a display device in which the luminance of the light emitting element 13 can be rapidly changed without causing the above-described malfunction in which the luminance of the light emitting element 13 is substantially increased even when the value of current supplied to the monitor light emitting element 66 is rapidly changed, and operation thereof.

Figure 14:
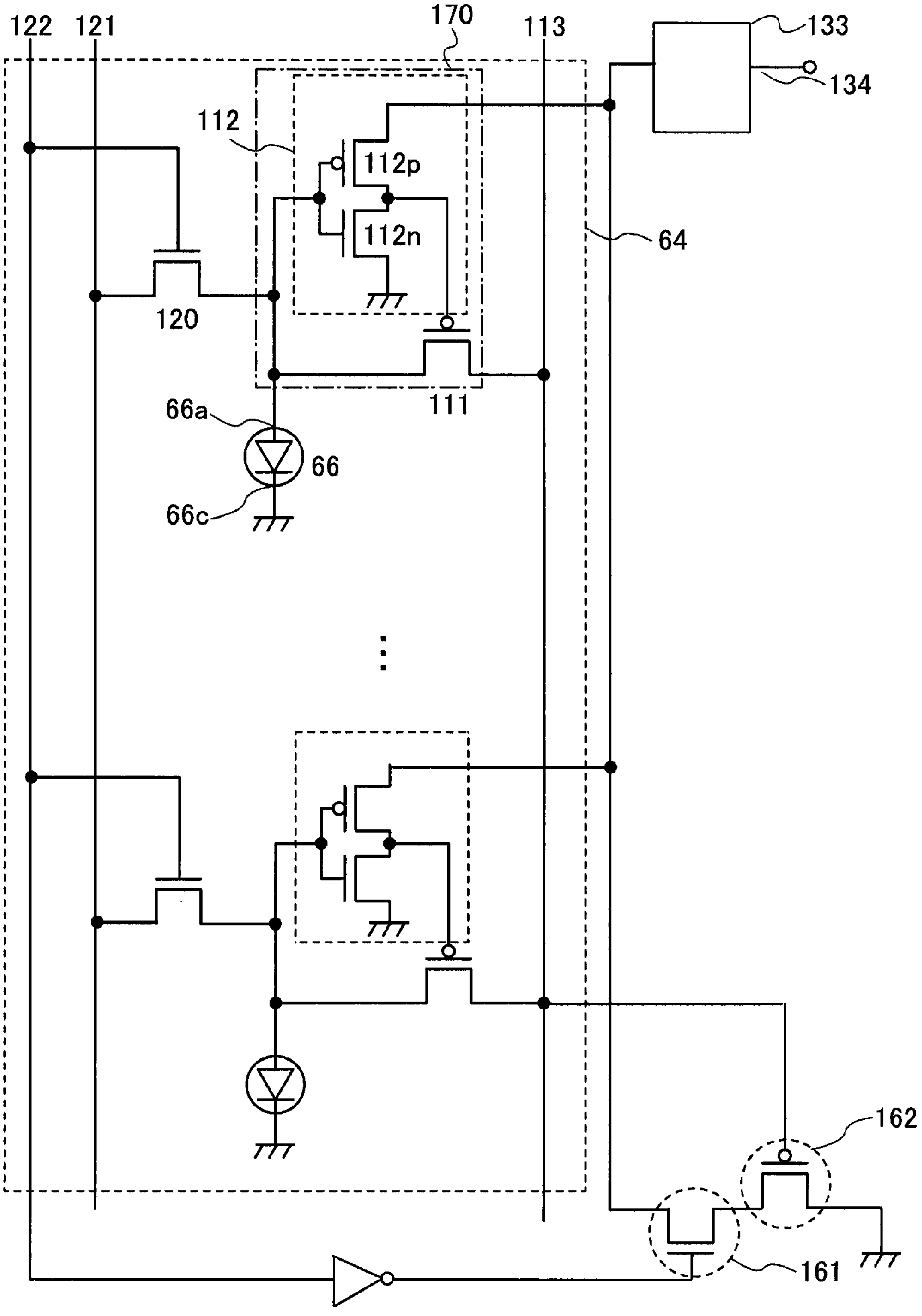
FIG. 14 is a diagram showing a monitor circuit of the present invention.

The above-described circuit configuration is explained with reference to FIG. 14. The positive power supply terminal of the inverter 112 is connected to a monitor inspection transistor 161. The monitor inspection transistor 161 is a switch which is turned off when the monitor inspection transistor 120 is on, and is turned on when the monitor inspection transistor 120 is off. Accordingly, at the time of normal driving where a current is supplied to the monitor light emitting element, the monitor inspection transistor 120 is off and the monitor inspection transistor 161 is on. On the contrary, at the time of inspecting the monitor circuit, the monitor inspection transistor 120 is on and the monitor inspection transistor 161 is off.

A drain terminal of a limiter TFT 162 is preferably supplied with the same potential as that of the cathode 13*c* of the light emitting element 13. In addition, a source terminal of the limiter TFT 162 is connected to the monitor inspection transistor 161. Further, a gate terminal of the limiter TFT 162 is connected to the monitor line 113. The other components are the same as those in the monitor circuit 64 shown in FIG. 8.

This limiter TFT 162 is provided so that a large difference is not generated between the potential of the monitor line 113 and the potential Va of the positive power supply terminal of the inverter 112 when the potential of the monitor line 113 is rapidly dropped. Therefore, an intermediate potential which may cause a malfunction is not inputted to the inverter 112. Accordingly, the above-described malfunction in which the luminance of the light emitting element 13 is substantially increased can be prevented.

The absolute value of a threshold voltage of the limiter TFT 162 is preferably small. This is so that a difference between the potential of the monitor line 113 and the potential Va_High of the positive power supply terminal of the inverter 112 can be reduced.

Also in each of the structures in Embodiment Modes 1 to 5, the circuit described in this embodiment mode is preferably connected. This is because it is not necessarily when the value of current is rapidly changed that a large difference is generated between the potential of the monitor line 113 and the potential Va_High of the positive power supply terminal of the inverter 112. For example, a similar malfunction may also be caused when noise is in the monitor line 113 and when noise is in the anode 66*a*. Also in this case, a malfunction can be prevented according to this embodiment mode.

At the time of inspecting the short interruption circuit 170, the limiter TFT 162 is electrically disconnected from the positive power supply terminal of the inverter 112. This is because the monitor circuits 64 are inspected and sorted into defective ones and non-defective ones depending on whether or not the potential of the monitor line 113 is higher than the potential Va_High of the positive power supply terminal of the inverter 112. This is the reason for providing the monitor inspection transistor 161.

As described above, a panel of this embodiment mode includes the plurality of monitor light emitting elements 66 and can correct luminance change due to deterioration over time of the light emitting element or a change in ambient temperature by using a circuit which corrects a voltage or a current to be supplied to the light emitting element 13 in consideration of a change of the monitor light emitting element 66. When an anode and a cathode of any of the plurality of monitor light emitting elements 66 are short-circuited, the luminance change due to the deterioration over time of the light emitting element or the change in ambient temperature can be corrected in this embodiment mode by the short interruption circuit 170 which electrically disconnects the short-circuited monitor light emitting element. In this embodiment mode, the luminance change due to the deterioration over time of the light emitting element or the change in ambient temperature can be corrected by the circuit which corrects a voltage or a current to be supplied to the light emitting element in consideration of the change of the monitor light emitting element even when a short circuit is generated not only in an early stage but also over time.

Further, since the lighting rate of the monitor light emitting element 66 can be freely set, more accurate correction can be conducted.

Furthermore, a display device of this embodiment mode has the ability to allow a user to set the luminance of a display region and does not cause a malfunction even when rapidly changing the luminance of the display region from high luminance into low luminance.

Note that this embodiment mode can be implemented in free combination with the above embodiment modes.

Embodiment Mode 8

In the present invention, reverse voltage can be applied to the light emitting element and the monitor light emitting element. Thus, this embodiment mode explains the case of applying reverse voltage.

If a voltage which is applied to make the light emitting element 13 and the monitor light emitting element 66 emit light is referred to as a forward voltage, a reverse voltage refers to a voltage which is obtained by inverting a high-level potential and a low-level potential of the forward voltage. In specific, referring to the monitor light emitting element 66, a potential lower than that of the power supply line 18 is applied to the monitor line 113 to invert the potentials of the anode 66*a* and the cathode 66*c*.

Figure 16:
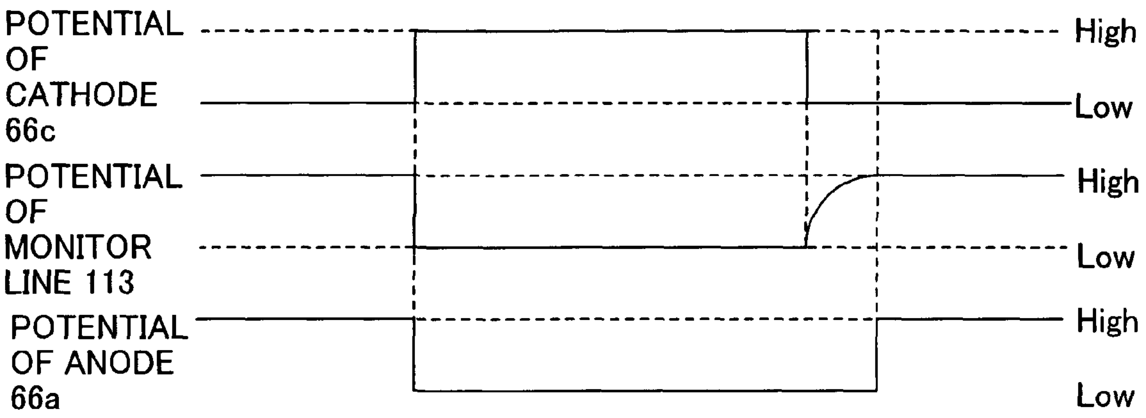
FIG. 16 is a diagram showing a timing chart of the present invention.

In specific, as shown in FIG. 16, the potential of the anode 66*a* and the potential of the cathode 66*c* are inverted. At the same time, the potential of the monitor line 113 (V113) is also inverted. This period in which the anode potential and the cathode potential are inverted is referred to as a reverse voltage application period. After a predetermined reverse voltage application period, the cathode potential is restored and a constant current is supplied to the monitor line 113. After the charge of the monitor line 113 is completed, that is, the voltage of the monitor line 113 is saturated, the potential of the monitor line 113 is restored. At this time, the potential of the monitor line 113 is restored in a curved manner because a plurality of monitor light emitting elements is charged with a constant current and further parasitic capacitance is also charged.

Preferably, the potential of the anode 66*a* is inverted and then the potential of the cathode 66*c* is inverted. Then, after a predetermined reverse voltage application period, the anode potential is restored and then the cathode potential is restored. At the same time as the inversion of the anode potential, the monitor line 113 is charged to have a High potential.

During this reverse voltage application period, the driving transistor 12 and the monitor control transistor 111 are required to be on.

As a result of applying a reverse voltage to the light emitting element 13, defects of the light emitting element 13 and the monitor light emitting element 66 can be improved to increase the reliability thereof. Each of the light emitting element 13 and the monitor light emitting element 66 may have an initial defect in which an anode and a cathode thereof are short-circuited due to attachment of foreign substances, a pinhole that is produced by minute projection of the anode or the cathode, or unevenness of an electroluminescent layer thereof. When such an initial defect is generated, light emission/non-light emission in accordance with signals is not performed and almost all of the current flow through the short-circuited portion. Consequently, favorable image display cannot be performed. In addition, such a defect may be generated in any pixel.

Thus, by applying a reverse voltage to the light emitting element 13 and the monitor light emitting element 66 as in this embodiment mode, a current locally flows to the short-circuited portion, and then, the short-circuited portion generates heat and can be oxidized or carbonized. As a result, the short-circuited portion can be insulated and a current flows to a region other than the insulated portion, so that the light emitting element 13 and the monitor light emitting element 66 can operate normally. By applying a reverse voltage in this manner, the initial defect can be eliminated even when it is generated. Note that the insulation of the short-circuited portion as described above is preferably performed before shipment.

Further, in addition to the initial defect, another defect in which the anode and the cathode are short-circuited may be generated over time. Such a defect is also referred to as a progressive defect. As in the present invention, by regularly applying a reverse voltage to the light emitting element 13 and the monitor light emitting element 66, the progressive defect can be eliminated even when it is generated, and the light emitting element 13 and the monitor light emitting element 66 can operate normally.

Furthermore, the application of a reverse voltage can also prevent image burn-in. The image burn-in is caused by deterioration of the light emitting element 13; the deterioration can be slowed down by applying a reverse voltage. As a result, image burn-in can be prevented.

In general, the deterioration of the light emitting element 13 and the monitor light emitting element 66 progresses rapidly in the initial stage and gradually slows down over time. In other words, in a pixel, the light emitting element 13 and the monitor light emitting element 66 that have deteriorated do not easily deteriorate further. As a result, variation is generated among the light emitting elements 13. Therefore, all of the light emitting elements 13 and the monitor light emitting elements 66 are preferably turned on such as before shipment or when no image is displayed, to cause elements that have not deteriorated to deteriorate. Thus, deterioration states of all the elements can be averaged. Such a structure for turning on all elements may be provided in a display device.

Note that this embodiment mode can be implemented in free combination with the above embodiment modes.

Embodiment Mode 9

This embodiment mode explains a pixel circuit and an example of its structure.

Figure 2:
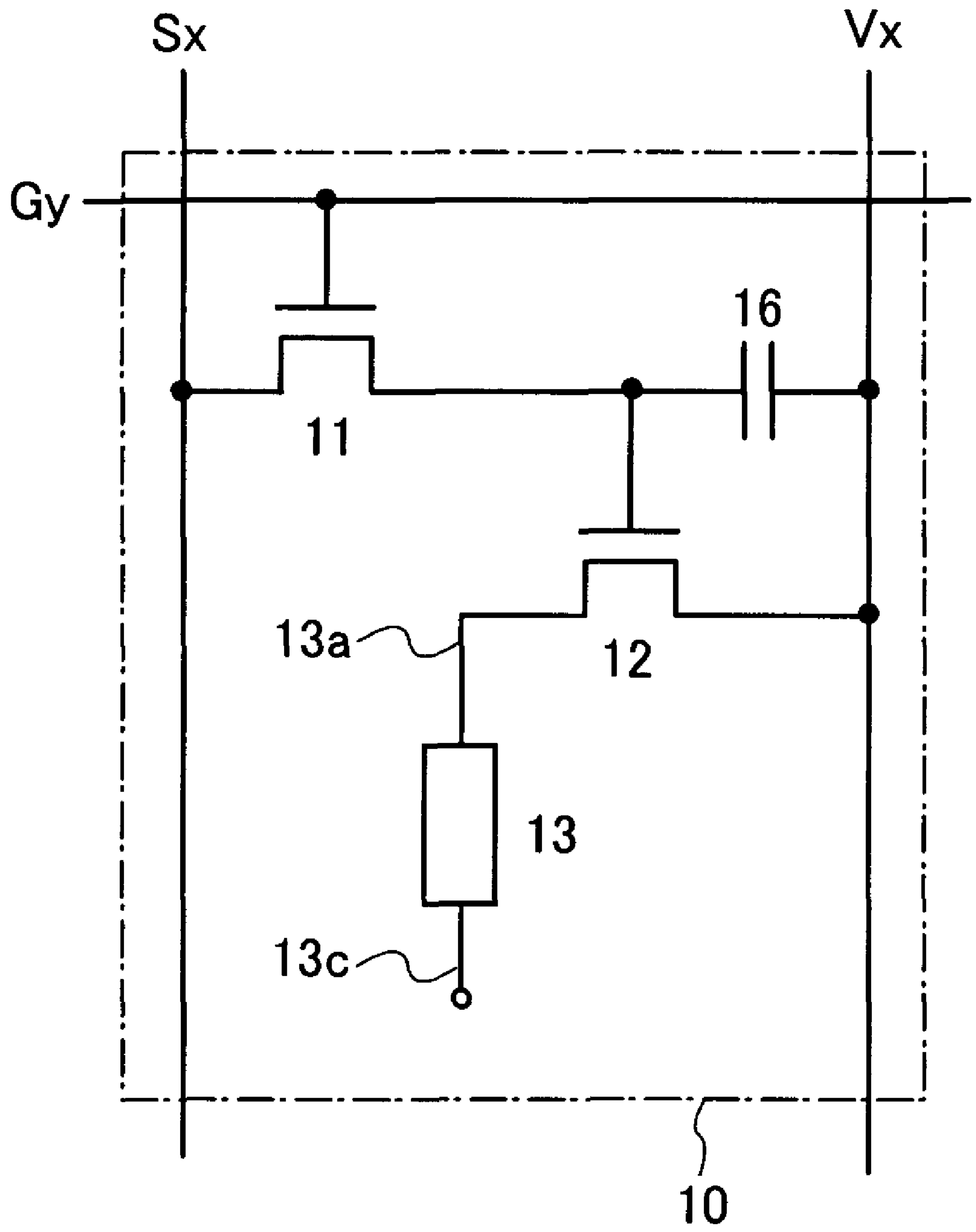
FIG. 2 is a diagram showing an equivalent circuit of a pixel of the present invention.

FIG. 2 shows a pixel circuit that can be used for a pixel portion of the present invention. In a pixel portion, signal lines, scan lines, and power supply lines are arranged in matrix, and pixels 10 are surrounded by them. Each of the pixels 10 includes a switching transistor 11, a driving transistor 12, a capacitor 16, and a light emitting element 13.

A connection relation in the pixel is explained. The switching transistor 11 is surrounded by a signal line Sx and a scan line Gy. One electrode of the switching transistor 11 is connected to the signal line Sx, and a gate electrode of the switching transistor 11 is connected to the scan line Gy. One electrode of the driving transistor 12 is connected to a power supply line Vx, and a gate electrode of the driving transistor 12 is connected to the other electrode of the switching transistor 11. The capacitor 16 is provided so as to hold a gate-source voltage of the driving transistor 12. In this embodiment mode, one electrode of the capacitor 16 is connected to Vx, and the other electrode thereof is connected to the gate electrode of the driving transistor 12. Note that the capacitor 16 does not need to be provided in a case where the driving transistor 12 has a large gate capacitance and a low leakage current, or the like. The light emitting element 13 is connected to the other electrode of the driving transistor 12.

A driving method of such a pixel is explained.

First, when the switching transistor 11 is turned on, a video signal is inputted from the signal line Sx. A charge is accumulated in the capacitor 16 based on the video signal. When the charge accumulated in the capacitor 16 exceeds the gate-source voltage (Vgs) of the driving transistor 12, the driving transistor 12 is turned on. Then, the light emitting element 13 is supplied with a current and is turned on. At this time, the driving transistor 12 can be operated in a linear region or a saturation region. When the driving transistor 12 is operated in the saturation region, a constant current can be supplied to the light emitting element 13. When the driving transistor 12 operates in the linear region, it can be operated at low voltage, which leads to a reduction in power consumption.

Hereinafter, the driving method of the pixel is explained with reference to a timing chart.

Figure 17A:
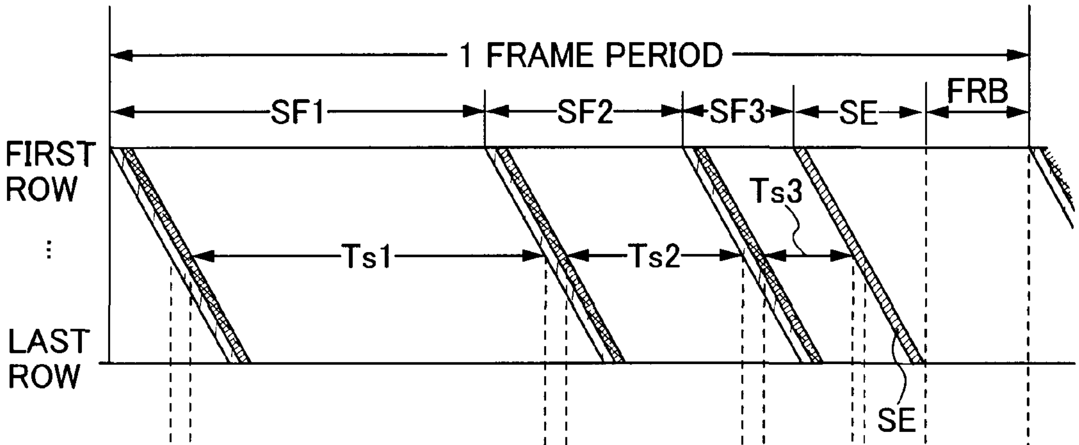
FIGS. 17A and 17B are diagrams showing timing charts of the present invention.

FIG. 17A shows a timing chart of a certain frame period in a case where 60 frames (images) are rewritten in one second. In the timing chart, the vertical axis indicates a scan line G (from first to the last rows) and the horizontal axis indicates time.

One frame period includes m (m is a natural number equal to or more than 2) subframe periods SF1, SF2, . . . , and SFm and a reverse voltage application period. The m subframe periods SF1, SF2, . . . , and SFm include writing operation periods Ta1, Ta2, . . . , and Tam, display periods (lighting periods) Ts1, Ts2, . . . , and Tsm, respectively. In this embodiment mode, as shown in FIG. 17A, one frame period includes subframe periods SF1, SF2, and SF3 and a reverse voltage application period (FRB). In the subframe periods, writing operation periods Ta1 to Ta3 are sequentially provided, which are followed by display periods Ts1 to Ts3, respectively.

Figure 17B:
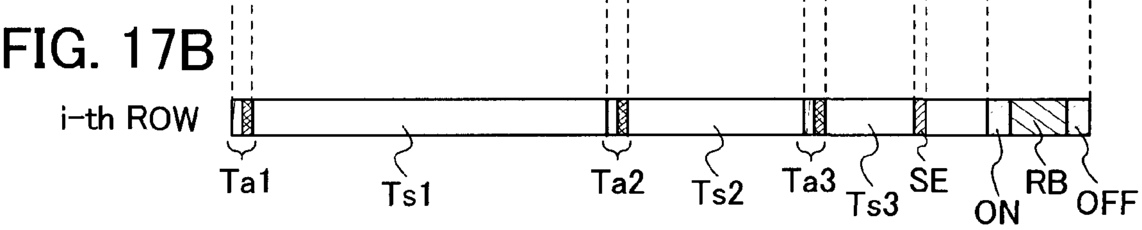

A timing chart shown in FIG. 17B shows writing operation periods, display periods, and a reverse voltage application period of a certain row (i-th row). After the writing operation periods and display periods are alternated, operation proceeds to the reverse voltage application period. This period including the writing operation periods and the display periods corresponds to a forward voltage application period.

A writing operation period Ta can be divided into a plurality of operation periods. In this embodiment mode, the writing operation period Ta is divided into two operation periods, in one of which an erasing operation is performed and in the other of which a writing operation is performed. In this manner, a WE (Write Erase) signal is inputted in order to perform the erasing operation and the writing operation. Other erasing operations and writing operations and signals are explained in detail in the following embodiment mode.

In addition, a period in which switching transistors of all pixels are simultaneously turned on, that is, a period in which all scan lines are on (On period) is provided shortly before the reverse voltage application period.

A period in which the switching transistors of all pixels are simultaneously turned off, that is, a period in which all scan lines are off (Off period) is preferably provided shortly after the reverse voltage application period.

In addition, an erasing period (SE) is provided shortly before the reverse voltage application period. In the erasing period, similar operation to the above-described erasing period can be performed. In the erasing period, data written in the last subframe period, SF3 in this embodiment mode is sequentially erased. This is because during On period, the switching transistors are simultaneously turned on after the display period of the pixels of the last row is completed, and thus each pixel of the first row and the like has an unnecessary display period.

The control for providing such On period, Off period, and erasing period is carried out by driver circuits such as a scan line driver circuit and a signal line driver circuit.

Note that the timing of applying a reverse voltage to the light emitting element 13, namely, the reverse voltage application period is not limited to those shown in FIGS. 17A and 17B. In other words, the reverse voltage application period is not necessarily provided in each frame period, nor in the latter part of one frame period. It is acceptable as long as the On period is provided shortly before the application period (RB) and the Off period is provided shortly after the application period (RB). In addition, the order of inverting the potentials of the anode and the cathode of the light emitting element is not limited to those shown in FIGS. 17A and 17B. In other words, the potential of the anode may be decreased after the potential of the cathode is increased.

Figure 3:
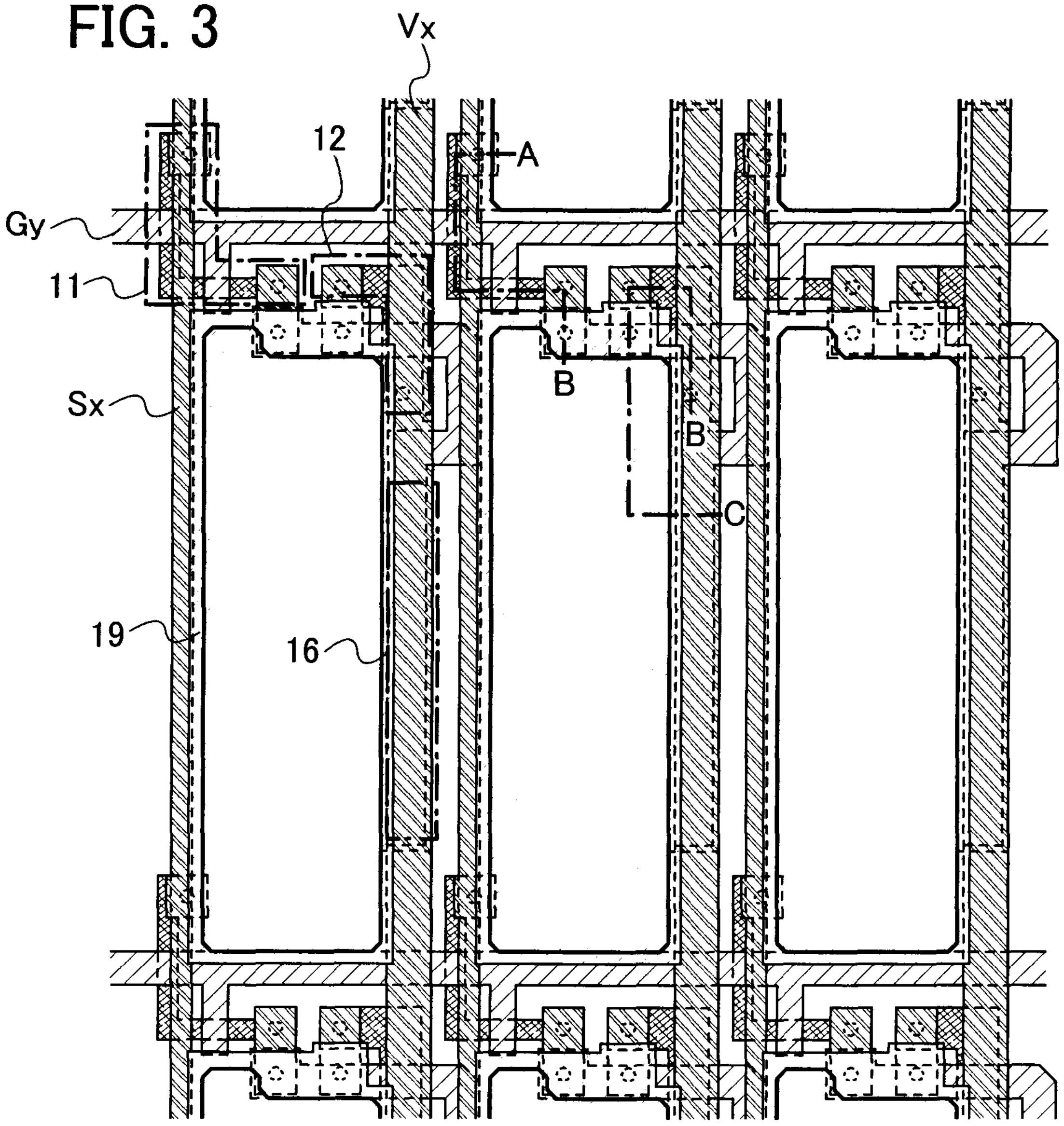
FIG. 3 is a diagram showing a layout of a pixel of the present invention.
Figure 4:
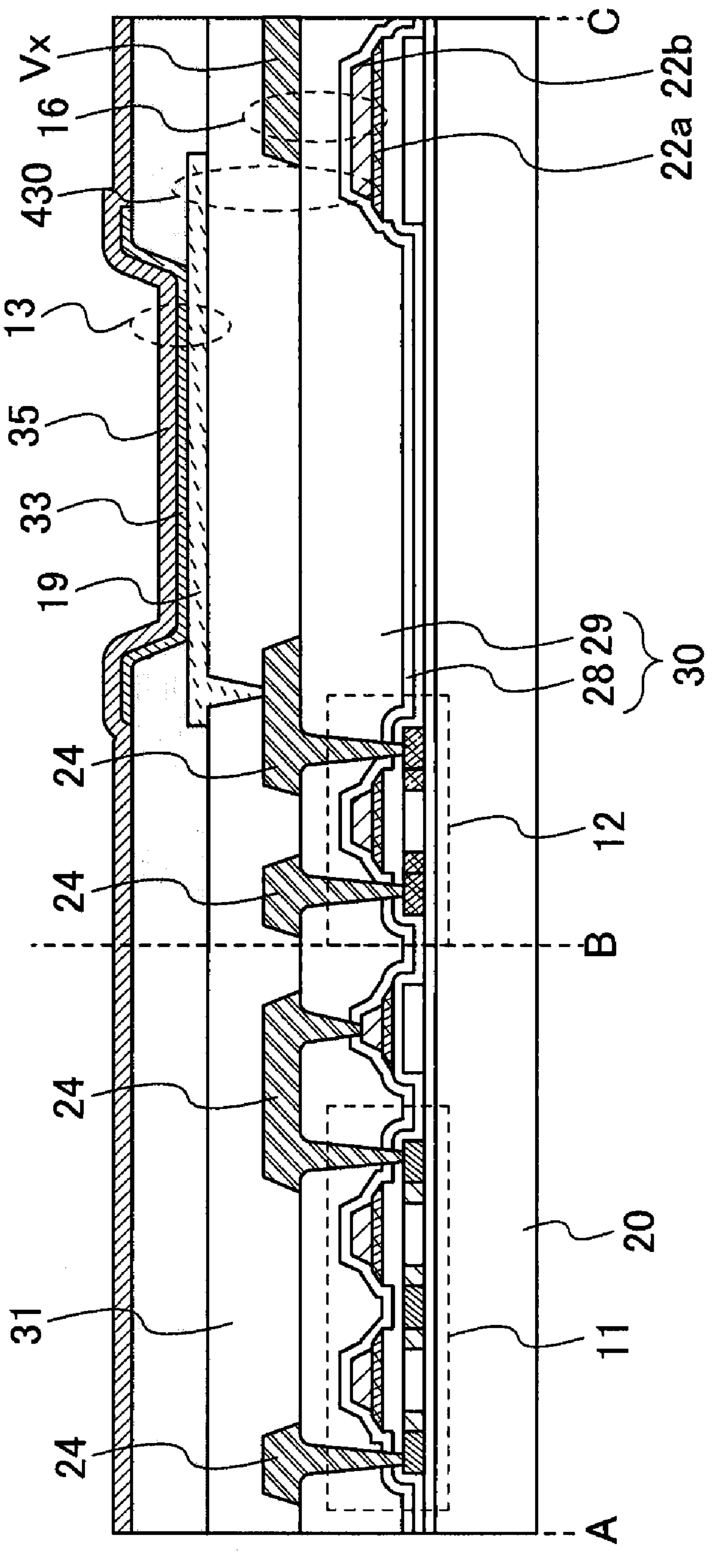
FIG. 4 is a diagram showing a cross section of a pixel of the present invention.

FIG. 3 shows an example of the layout of the pixel circuit shown in FIG. 2. FIG. 4 shows an example of a cross sectional view taken along lines A-B and B-C shown in FIG. 3. A semiconductor film which is to be a part of the switching transistor 11 and the driving transistor 12 is formed. Then, a first conductive film is formed with an insulating film functioning as a gate insulating film interposed therebetween. The conductive film is used for gate electrodes of the switching transistor 11 and the driving transistor 12, and can also be used for the scan line Gy. In this case, the switching transistor 11 preferably has a double-gate structure.

After that, a second conductive film is formed with an insulating film functioning as an interlayer insulating film interposed therebetween. The conductive film is used for drain and source wirings of the switching transistor 11 and the driving transistor 12, and can also be used for the signal line Sx and the power supply line Vx. In this case, the capacitor 16 can be formed by stacking the first conductive film, the insulating film functioning as an interlayer insulating film, and the second conductive film. The gate electrode of the driving transistor 12 is connected to the other electrode of the switching transistor through a contact hole.

A pixel electrode 19 is formed in an opening provided in the pixel. The pixel electrode 19 is connected to the other electrode of the driving transistor 12. If an insulating film and the like are formed between the second conductive film and the pixel electrode, the pixel electrode needs to be connected to the other electrode of the driving transistor 12 through a contact hole. If an insulating film and the like are not formed, the pixel electrode can be connected directly to the other electrode of the driving transistor 12.

The first conductive film may overlap with the pixel electrode as in a region 430 to secure a high aperture ratio as shown in FIGS. 3 and 4. Coupling capacitance may be generated in the region 430. This coupling capacitance is an unnecessary capacitance. The influence of such an unnecessary capacitance can be reduced by the above-described driving method.

An example of a cross sectional view is hereinafter explained with reference to FIG. 4.

A semiconductor film is formed over the insulating substrate 20 with a base film interposed therebetween and is then etched selectively. The insulating substrate 20 may be, for example, a glass substrate of barium borosilicate glass, alumino borosilicate glass, or the like, a quartz substrate, a stainless-steel substrate, or the like. Although a substrate made of a flexible synthetic resin such as acrylic or plastic typified by PET (polyethylene terephthalate), PEN (polyethylene naphthalate), and PES (polyether sulfone) tends to have lower heat resistance than other substrates, it may be used as long as it can withstand a processing temperature during a manufacturing process. The base film may be formed using an insulating film such as a silicon oxide film, a silicon nitride film, or a silicon nitride oxide film.

An amorphous semiconductor film is formed over the base film so as to have a thickness of 25 nm to 100 nm (preferably, 30 nm to 60 nm). Silicon germanium as well as silicon can be used for the amorphous semiconductor film.

Next, the amorphous semiconductor film is crystallized as needed to form a crystalline semiconductor film. The crystallization may be performed using a heating furnace, laser irradiation, irradiation with light emitted from a lamp (hereinafter referred to as lamp annealing), or a combination of them. For example, a crystalline semiconductor film is formed by adding a metal element to an amorphous semiconductor film and applying heat treatment using a heating furnace. A semiconductor film can be crystallized at low temperature by adding a metal element as described above, which is preferable.

The thus formed crystalline semiconductor film is etched into a predetermined shape. The predetermined shape is a shape to be the switching transistor 11 and the driving transistor 12 as shown in FIG. 3.

Next, an insulating film functioning as a gate insulating film is formed. The insulating film is formed with a thickness of 10 nm to 150 nm, and preferably 20 nm to 40 nm so as to cover the semiconductor film. The insulating film may have a single-layer structure or a stacked-layer structure using, for example, a silicon oxynitride film, a silicon oxide film, and the like.

Then, a first conductive film functioning as a gate electrode is formed over the gate insulating film. Although the gate electrode may have a single-layer structure or a stacked-layer structure, it has a stacked-layer structure of conductive films 22*a* and 22*b* in this embodiment mode. Each of the conductive films 22*a* and 22*b* may be formed of an element selected from Ta, W, Ti, Mo, Al, and Cu, or an alloy or compound material mainly containing any of these elements. In this embodiment mode, the conductive film 22*a* is made of a tantalum nitride film with a thickness of 10 nm to 50 nm, for example 30 nm, and the conductive film 22*b* is stacked thereover using a tungsten film with a thickness of 200 nm to 400 nm, for example 370 nm.

An impurity element is added using the gate electrode as a mask. At this time, a low concentration impurity region may be formed in addition to a high concentration impurity region. This structure is called an LDD (Lightly Doped Drain) structure. In particular, a structure where the low concentration impurity region overlaps with the gate electrode is called a GOLD (Gate Overlapped LDD) structure. In particular, an n-channel transistor preferably has the low concentration impurity region.

This low concentration impurity region may cause unwanted capacitance to be formed. Accordingly, the driving method of the present invention is preferably used in the case of forming a pixel using a TFT having an LDD structure or a GOLD structure.

After that, insulating films 28 and 29 functioning as an interlayer insulating film 30 are formed. It is acceptable as long as the insulating film 28 is an insulating film containing nitrogen, and in this embodiment mode, a silicon nitride film with a thickness of 100 nm is formed by a plasma CVD method. The insulating film 29 can be formed using an organic material or an inorganic material. The organic material includes polyimide, acrylic, polyamide, polyimide amide, benzocyclobutene, siloxane, and polysilazane. Siloxane has a skeleton formed by the bond of silicon (Si) and oxygen (O), and is formed using as a starting material a polymer material including at least hydrogen or at least one of fluorine, an alkyl group, and aromatic hydrocarbon. Polysilazane is formed using as a starting material a liquid material containing a polymer material having the bond of silicon (Si) and nitrogen (N). The inorganic material includes an insulating material containing oxygen or nitrogen such as silicon oxide ($SiO_x$), silicon nitride ($SiN_x$), silicon oxynitride ($SiO_xN_y$) (x>y), or silicon nitride oxide ($SiN_xO_y$) (x>y). Alternatively, the insulating film 29 may have a stacked-layer structure of these insulating films. In particular, when the insulating film 29 is formed using an organic material, planarity is improved while moisture and oxygen are absorbed by the organic material. In order to prevent this, an insulating film containing an inorganic material may be formed over the organic material. An insulating film containing nitrogen is preferably used as the inorganic material because alkali ions such as Na can be prevented from entering. An organic material is preferably used for the insulating film 29 because planarity can be improved.

A contact hole is formed in the interlayer insulating film 30 and the gate insulating film. Then, a second conductive film is formed, which functions as source and drain wirings 24 of the switching transistor 11 and the driving transistor 12, the signal line Sx, and the power supply line Vx. The second conductive film may be formed using an element such as aluminum (Al), titanium (Ti), molybdenum (Mo), tungsten (W), or silicon (Si), or an alloy using such elements. In this embodiment mode, the second conductive film is formed by stacking a titanium (Ti) film, a titanium nitride (TiN) film, a titanium-aluminum alloy (Ti—Al) film, and a titanium (Ti) film, which have thicknesses of 60 nm, 40 nm, 300 nm, and 100 nm respectively.

After that, an insulating film 31 is formed so as to cover the second conductive film. The insulating film 31 may be formed using any of the materials of the interlayer insulating film 30 described above. An aperture ratio can be increased by providing such an insulating film 31.

The pixel electrode (also referred to as a first electrode) 19 is formed in the opening provided in the insulating film 31. In order to increase the step coverage of the pixel electrode in the opening, the end portion of the insulating film 31 is preferably rounded so as to have a plurality of radii of curvature. The pixel electrode 19 can also be formed using a light transmitting material such as indium tin oxide (ITO), indium zinc oxide (IZO) obtained by mixing zinc oxide (ZnO) of 2 wt % to 20 wt % into indium oxide, ITO—SiOx obtained by mixing silicon oxide ($SiO_2$) of 2 wt % to 20 wt % into indium oxide, organic indium, or organotin. The pixel electrode 19 can also be formed using a non-light transmitting material such as an element selected from silver (Ag), tantalum, tungsten, titanium, molybdenum, aluminum, and copper, or an alloy or compound material mainly containing any of these elements. When the insulating film 31 is formed using an organic material to improve planarity at this time, the surface planarity over which the pixel electrode is formed is improved, which allows a uniform voltage to be applied and prevents a short circuit.

A coupling capacitance may be generated in the region 430 where the first conductive film overlaps with the pixel electrode. This coupling capacitance is an unnecessary capacitance. Such an unnecessary capacitance can be eliminated by the driving method of the present invention.

Then, an electroluminescent layer 33 is formed by an evaporation method or an ink-jet method. The electroluminescent layer 33 is formed by arbitrarily combining an electron injection layer (EIL), an electron transport layer (ETL), a light emitting layer (EML), a hole transport layer (HTL), a hole injection layer (HIL), and the like using an organic material or an inorganic material. Note that the boundary between each layer is not necessarily clearly defined, and there is also a case where materials of the respective layers are partially mixed with each other, which blurs the boundary. The structure of the electroluminescent layer 33 is not limited to the above-described stacked layer structure.

A second electrode 35 is formed by a sputtering method or an evaporation method. The first electrode (pixel electrode) 19 and the second electrode 35 of a light emitting element function as an anode or a cathode depending on a pixel structure.

An anode material is preferably a metal, an alloy, a conductive compound, or a mixture thereof which has a high work function (work function of 4.0 eV or higher). More specifically, the anode material may be ITO, IZO obtained by mixing zinc oxide (ZnO) of 2 wt % to 20 wt % into indium oxide, gold (Au), platinum (Pt), nickel (Ni), tungsten (W), chromium (Cr), molybdenum (Mo), iron (Fe), cobalt (Co), copper (Cu), palladium (Pd), nitride of a metal material (such as TiN), or the like.

On the other hand, a cathode material is preferably a metal, an alloy, a conductive compound, or a mixture thereof which has a low work function (work function of 3.8 eV or lower). More specifically, the cathode material may be an element belonging to Group 1 or Group 2 of the periodic table, namely an alkali metal such as Li or Cs, an alkaline earth metal such as Mg, Ca, or Sr, an alloy (Mg:Ag, Al:Li) or a compound (LiF, CsF, $CaF_2$) containing them, or a transition metal including a rare earth metal. Since the cathode is required to transmit light, these metals or alloys containing them are formed extremely thin and stacked with a metal (including an alloy) such as ITO.

Then, a protective film may be formed so as to cover the second electrode 35. As the protective film, a silicon nitride film or a DLC film can be used.

In this manner, the pixel of the display device can be formed.

Note that this embodiment mode can be implemented in free combination with the above embodiment modes.

Embodiment Mode 10

This embodiment mode explains an overall structure of a panel including the pixel circuit described in the above embodiment mode.

Figure 18:
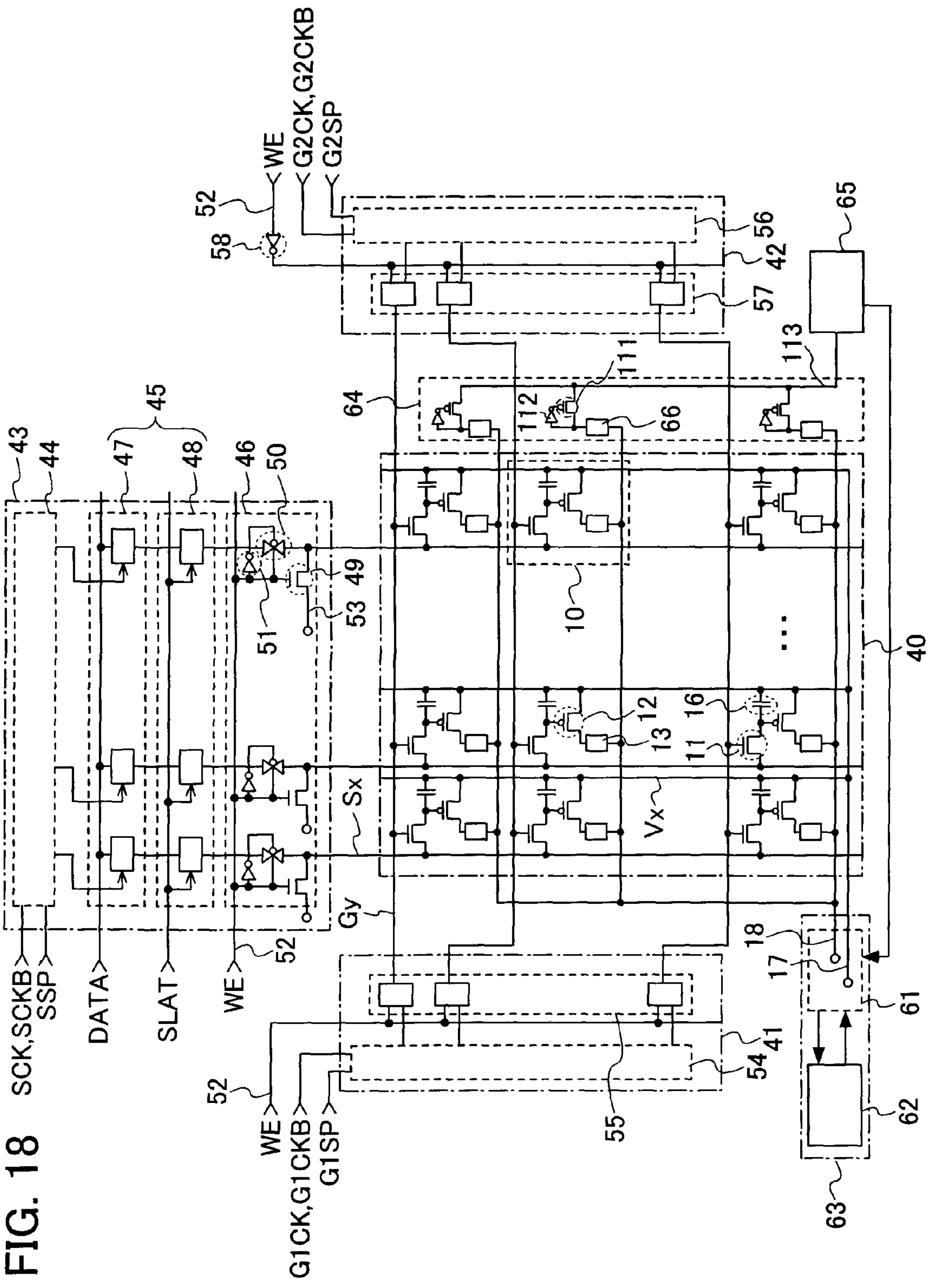
FIG. 18 is a diagram showing a panel of the present invention.

As shown in FIG. 18, a display device of this embodiment mode includes a pixel portion 40 where a plurality of above-described pixels 10 is arranged in matrix, a first scan line driver circuit 41, a second scan line driver circuit 42, and a signal line driver circuit 43. The first scan line driver circuit 41 and the second scan line driver circuit 42 may be located so as to face each other with the pixel portion 40 interposed therebetween, or may be located on one of the four sides of the pixel portion 40.

The signal line driver circuit 43 includes a pulse output circuit 44, a latch 45, and a selection circuit 46. The latch 45 includes a first latch 47 and a second latch 48. The selection circuit 46 includes a transistor (hereinafter referred to as a "TFT 49") and an analog switch 50 as switching means. The TFT 49 and the analog switch 50 are provided in each column corresponding to a signal line. In addition, in this embodiment mode, an inverter 51 is provided in each column for generating an inverted signal of a WE signal. Note that the inverter 51 is not necessarily provided when an inverted signal of a WE signal is supplied externally.

A gate electrode of the TFT 49 is connected to a selection signal line 52, one electrode thereof is connected to a signal line, and the other electrode thereof is connected to a power supply line 53. The analog switch 50 is provided between the second latch 48 and each signal line. In other words, an input terminal of the analog switch 50 is connected to the second latch 48, and an output terminal thereof is connected to the signal line. One of two control terminals of the analog switch 50 is connected to the selection signal line 52 and the other is connected to the selection signal line 52 through the inverter 51. The power supply line 53 has a potential that turns off the driving transistor 12 in each pixel, and the potential of the power supply line 53 is set to Low if the driving transistor 12 has n-channel type conductivity and is set to High if the driving transistor 12 has p-channel type conductivity.

The first scan line driver circuit 41 includes a pulse output circuit 54 and a selection circuit 55. The second scan line driver circuit 42 includes a pulse output circuit 56 and a selection circuit 57. Start pulses (G1SP, G2SP) are inputted to the pulse output circuits 54 and 56, respectively. Clock pulses (G1CK, G2CK) and inverted clock pulses thereof (G1CKB, G2CKB) are inputted to the pulse output circuits 54 and 56, respectively.

The selection circuits 55 and 57 are connected to the selection signal line 52. No that the selection circuit 57 included in the second scan line driver circuit 42 is connected to the selection signal line 52 through an inverter 58. In other words, WE signals inputted to the selection circuits 55 and 57 through the selection signal line 52 are inverted to each other.

Each of the selection circuits 55 and 57 includes a tri-state buffer. The tri-state buffer is put in an operating state when a signal transmitted through the selection signal line 52 is at H level and in a high-impedance state when the signal is at L level.

Each of the pulse output circuit 44 included in the signal line driver circuit 43, the pulse output circuit 54 included in the first scan line driver circuit 41, and the pulse output circuit 56 included in the second scan line driver circuit 42 includes a shift register having a plurality of flip-flop circuits or a decoder circuit. If a decoder circuit is used as the pulse output circuits 44, 54, and 56, a signal line or a scan line can be selected at random. By selecting a signal line or a scan line at random, a pseudo contour generated when employing a time gray scale method can be suppressed.

The configuration of the signal line driver circuit 43 is not limited to the above description, and a level shifter or a buffer may be additionally provided. The configurations of the first scan line driver circuit 41 and the second scan line driver circuit 42 are also not limited to the above description, and a level shifter or a buffer may be additionally provided. In addition, each of the signal line driver circuit 43, the first scan line driver circuit 41, and the second scan line driver circuit 42 may include a protection circuit.

Further, a protection circuit may be provided. The protection circuit may include a plurality of resistors. For example, p-channel transistors can be used as the plurality of resistors. The protection circuit may be provided in each of the signal line driver circuit 43, the first scan line driver circuit 41, and the second scan line driver circuit 42. Preferably, the protection circuit is provided between the pixel portion 40 and each of the signal line driver circuit 43, the first scan line driver circuit 41, and the second scan line driver circuit 42. Such a protection circuit can suppress deterioration or destruction of elements due to static electricity.

In this embodiment mode, the display device includes a power supply control circuit 63. The power supply control circuit 63 includes a power supply circuit 61 for supplying power to the light emitting element 13 and a controller 62. The power supply circuit 61 includes a first power supply line 17, and the first power supply line 17 is connected to the pixel electrode of the light emitting element 13 through the driving transistor 12 and the power supply line Vx. The power supply circuit 61 also includes a second power supply line 18, and the second power supply line 18 is connected to the light emitting element 13 through a power supply line connected to an opposite electrode.

When a forward voltage is applied to the light emitting element 13 so that the light emitting element 13 is supplied with current and made to emit light, the potential of the first power supply line 17 is set to be higher than that of the second power supply line 18 in the power supply circuit 61. On the other hand, when a reverse voltage is applied to the light emitting element 13, the potential of the first power supply line 17 is set to be lower than that of the second power supply line 18. The setting of the power supply lines as described above can be conducted by supplying a predetermined signal from the controller 62 to the power supply circuit 61.

In this embodiment mode, the display device further includes a monitor circuit 64 and a control circuit 65. The control circuit 65 includes a constant current source 105 and a buffer amplifier circuit 110. The monitor circuit 64 includes a monitor light emitting element 66, a monitor control transistor 111, and an inverter 112.

The control circuit 65 supplies a signal for correcting a power source potential to the power supply control circuit 63 in accordance with an output of the monitor circuit 64. The power supply control circuit 63 corrects a power source potential supplied to the pixel portion 40 in accordance with a signal supplied from the control circuit 65.

In the display device described in this embodiment mode having the above-described structure, a change in current value due to a change in ambient temperature or deterioration over time can be suppressed to improve reliability. Further, the monitor control transistor 111 and the inverter 112 prevent a current from the constant current source 105 from flowing to a short-circuited monitor light emitting element, and an accurate change in current value can be supplied to the light emitting element 13.

Note that this embodiment mode can be implemented in free combination with the above embodiment mode.

Embodiment Mode 11

This embodiment mode explains the operation of the display device having the above-described structure, with reference to drawings.

Figure 19A:
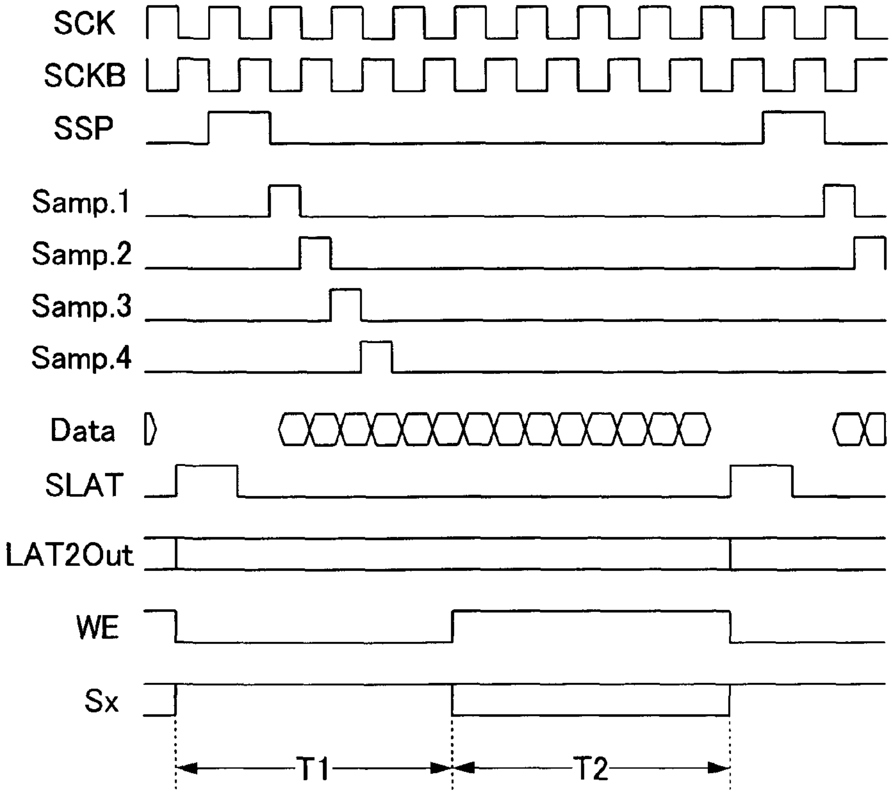
FIGS. 19A and 19B are diagrams showing timing charts of the present invention.

First, the operation of the signal line driver circuit 43 is explained with reference to FIG. 19A. A clock signal (hereinafter referred to as SCK), an inverted clock signal (hereinafter referred to as SCKB), and a start pulse (hereinafter referred to as SSP) are inputted to the pulse output circuit 44, and a sampling pulse is outputted to the first latch 47 in accordance with the timing of these signals. The first latch 47 to which data is inputted holds video signals from the first to the last columns in accordance with the timing at which the sampling pulse is inputted. When a latch pulse is inputted to the second latch 48, the video signals held in the first latch 47 are simultaneously transmitted to the second latch 48.

Here, a period in which a WE signal transmitted through the selection signal line 52 is at L level is referred to as a period T1, and a period in which a WE signal is at H level is referred to as a period T2. The operation of the selection circuit 46 in each period is explained. Each of the periods T1 and T2 corresponds to half of a horizontal scan period, and the period T1 is called a first subgate selection period and the period T2 is called a second subgate selection period.

During the period T1 (first subgate selection period), a WE signal transmitted through the selection signal line 52 is at L level, the TFT 49 is in an on state, and the analog switch 50 is in a non-conductive state. Then, a plurality of signal lines S1 to Sn is electrically connected to the power supply lines 53 through the TFTs 49 provided in respective columns. In other words, the potentials of the plurality of signal lines S1 to Sn are equal to the potentials of the power supply lines 53. At this time, the switching transistor 11 included in the selected pixel 10 is on, and the potential of the power supply line 53 is transmitted to the gate electrode of the driving transistor 12 through the switching transistor 11. Then, the driving transistor 12 is turned off, no current flows between both electrodes of the light emitting element 13, and the light emitting element does not emit light. In this manner, the potential of the power supply line 53 is transmitted to the gate electrode of the driving transistor 12 regardless of the state of a video signal inputted to a signal line Sx, and thus the switching transistor 11 is turned off and light emission of the light emitting element 13 is forcibly stopped. Such an operation is called an erasing operation.

During the period T2 (second subgate selection period), a WE signal transmitted through the selection signal line 52 is at H level, the TFT 49 is in an off state, and the analog switch 50 is in a conductive state. Then, the video signals for one row held in the second latch 48 are simultaneously transmitted to the respective signal lines S1 to Sn. At this time, the switching transistor 11 included in the pixel 10 is turned on, and the video signal is transmitted to the gate electrode of the driving transistor 12 through the switching transistor 11. Then, the driving transistor 12 is turned on or off depending on the inputted video signal, so that first and second electrodes of the light emitting element 13 have different potentials or the same potential. More specifically, when the driving transistor 12 is turned on, the first and second electrodes of the light emitting element 13 have different potentials and a current flows to the light emitting element 13. Then, the light emitting element 13 is made to emit light. Note that the current flowing through the light emitting element 13 is equal to the current flowing between the source and the drain of the driving transistor 12.

On the other hand, when the driving transistor 12 is turned off, the first and second electrodes of the light emitting element 13 have the same potential and no current flows through the light emitting element 13. Then, the light emitting element 13 is made to emit no light. In this manner, the driving transistor 12 is turned on or off depending on a video signal, and the first and second electrodes of the light emitting element 13 have different potentials or the same potential. Such an operation is called a writing operation.

Figure 19B:
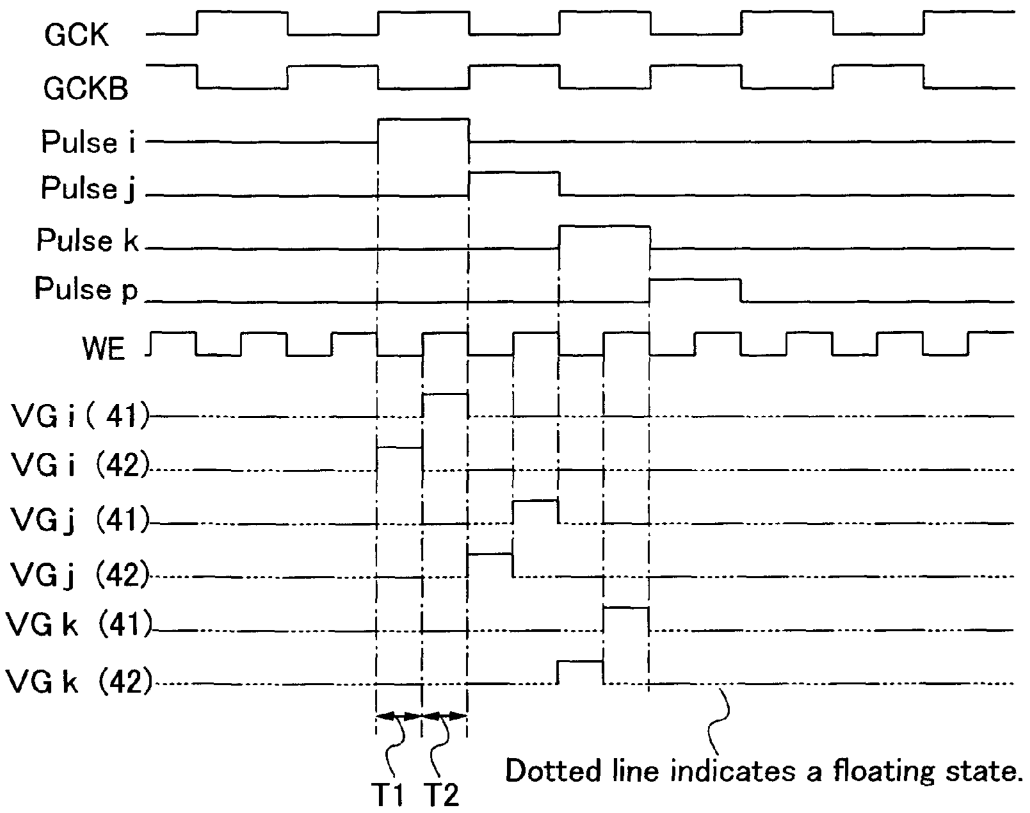

Next, the operations of the first scan line driver circuit 41 and the second scan line driver circuit 42 are explained. A clock signal G1CK, an inverted clock signal G1CKB, and a start pulse G1SP are inputted to the pulse output circuit 54, and pulses are sequentially outputted to the selection circuit 55 in accordance with the timing of these signals. A clock signal G2CK, an inverted clock signal G2CKB, and a start pulse G2SP are inputted to the pulse output circuit 56, and pulses are sequentially outputted to the selection circuit 57 in accordance with the timing of these signals. FIG. 19B shows potentials of pulses supplied to the i-th, j-th, k-th, and p-th rows (i, j, k, and p are natural numbers, 1≦i, j, k, p≦n) of each column of the selection circuits 55 and 57.

Here, similar to the explanation of the operation of the signal line driver circuit 43, a period in which a WE signal transmitted through the selection signal line 52 is at L level is referred to as a period T1, and a period in which a WE signal is at H level is referred to as a period T2. The operations, in each period, of the selection circuit 55 included in the first scan line driver circuit 41 and the selection circuit 57 included in the second scan line driver circuit 42 are explained. Note that in the timing chart of FIG. 19B, the potential of a gate line Gy (y is a natural number, 1≦y≦n) to which a signal is transmitted from the first scan line driver circuit 41 is denoted by VGy (41), and the potential of the gate line to which a signal is transmitted from the second scan line driver circuit 42 is denoted by VGy (42). The potentials VGy (41) and VGy (42) can be supplied through the same gate line Gy.

During the period T1 (first subgate selection period), a WE signal transmitted through the selection signal line 52 is at L level. Then, an L-level WE signal is inputted to the selection circuit 55 included in the first scan line driver circuit 41, so that the selection circuit 55 is put in a floating state. On the other hand, an inverted WE signal, namely an H-level signal is inputted to the selection circuit 57 included in the second scan line driver circuit 42, so that the selection circuit 57 is put in an operating state. That is to say, the selection circuit 57 transmits the H-level signal (row selection signal) to a gate line Gi of the i-th row, so that the gate line Gi has the same potential as the H-level signal. In other words, the gate line Gi of the i-th row is selected by the second scan line driver circuit 42. As a result, the switching transistor 11 included in the pixel 10 is turned on. Then, the potential of the power supply line 53 included in the signal line driver circuit 43 is transmitted to the gate electrode of the driving transistor 12, the driving transistor 12 is turned off, and the both electrodes of the light emitting element 13 have the same potential. In other words, the erasing operation for making the light emitting element 13 emit no light is performed in this period.

During the period T2 (second subgate selection period), a WE signal transmitted through the selection signal line 52 is at H level. Then, an H-level WE signal is inputted to the selection circuit 55 included in the first scan line driver circuit 41, so that the selection circuit 55 is put in an operating state. That is to say, the selection circuit 55 transmits the H-level signal to the gate line Gi of the i-th row, so that the gate line Gi has the same potential as that of the H-level signal. In other words, the gate line Gi of the i-th row is selected by the first scan line driver circuit 41. As a result, the switching transistor 11 included in the pixel 10 is turned on. Then, a video signal is transmitted from the second latch 48 included in the signal line driver circuit 43 to the gate electrode of the driving transistor 12, the driving transistor 12 is turned on or off, and the two electrodes of the light emitting element 13 have different potentials or the same potential. That is to say, the writing operation for making the light emitting element 13 emit light or no light is performed in this period. Meanwhile, an L-level signal is inputted to the selection circuit 57 included in the second scan line driver circuit 42, so that the selection circuit 57 is put in a floating state.

As described above, the gate line Gy is selected by the second scan line driver circuit 42 during the period T1 (first subgate selection period), and selected by the first scan line driver circuit 41 during the period T2 (second subgate selection period). That is to say, the gate line is controlled by the first scan line driver circuit 41 and the second scan line driver circuit 42 in a complementary manner. The erasing operation is performed during one of the first and second subgate selection periods, and the writing operation is performed during the other thereof.

During a period in which the first scan line driver circuit 41 selects the gate line Gi of the i-th row, the second scan line driver circuit 42 does not operate (the selection circuit 57 is in a floating state), or transmits a row selection signal to gate lines of rows other than the i-th row. Similarly, during a period in which the second scan line driver circuit 42 transmits a row selection signal to the gate line Gi of the i-th row, the first scan line driver circuit 41 is in a floating state, or transmits a row selection signal to the gate lines of rows other than the i-th row.

In the display device which performs the above-described operation, the light emitting element 13 can be forcibly turned off; therefore, a duty ratio can be improved. Further, the light emitting element 13 can be forcibly turned off without providing a TFT for discharging the charges of the capacitor 16; therefore, a high aperture ratio can be obtained. When the high aperture ratio is obtained, the luminance of the light emitting element can be lowered with the increase in light emitting area. In other words, the drive voltage can be lowered and thus power consumption can be reduced.

Note that the display device described in this embodiment mode is not limited to the above mode in which the gate selection period is divided into two periods. The gate selection period may be divided into three ore more periods.

Note that this embodiment mode can be implemented in free combination with the above embodiment modes.

Embodiment Mode 12

This embodiment mode describes an example of a pixel structure to which the driving method of the present invention can be applied. Note that the explanation of the same components as those shown in FIG. 2 is omitted.

Figure 20:
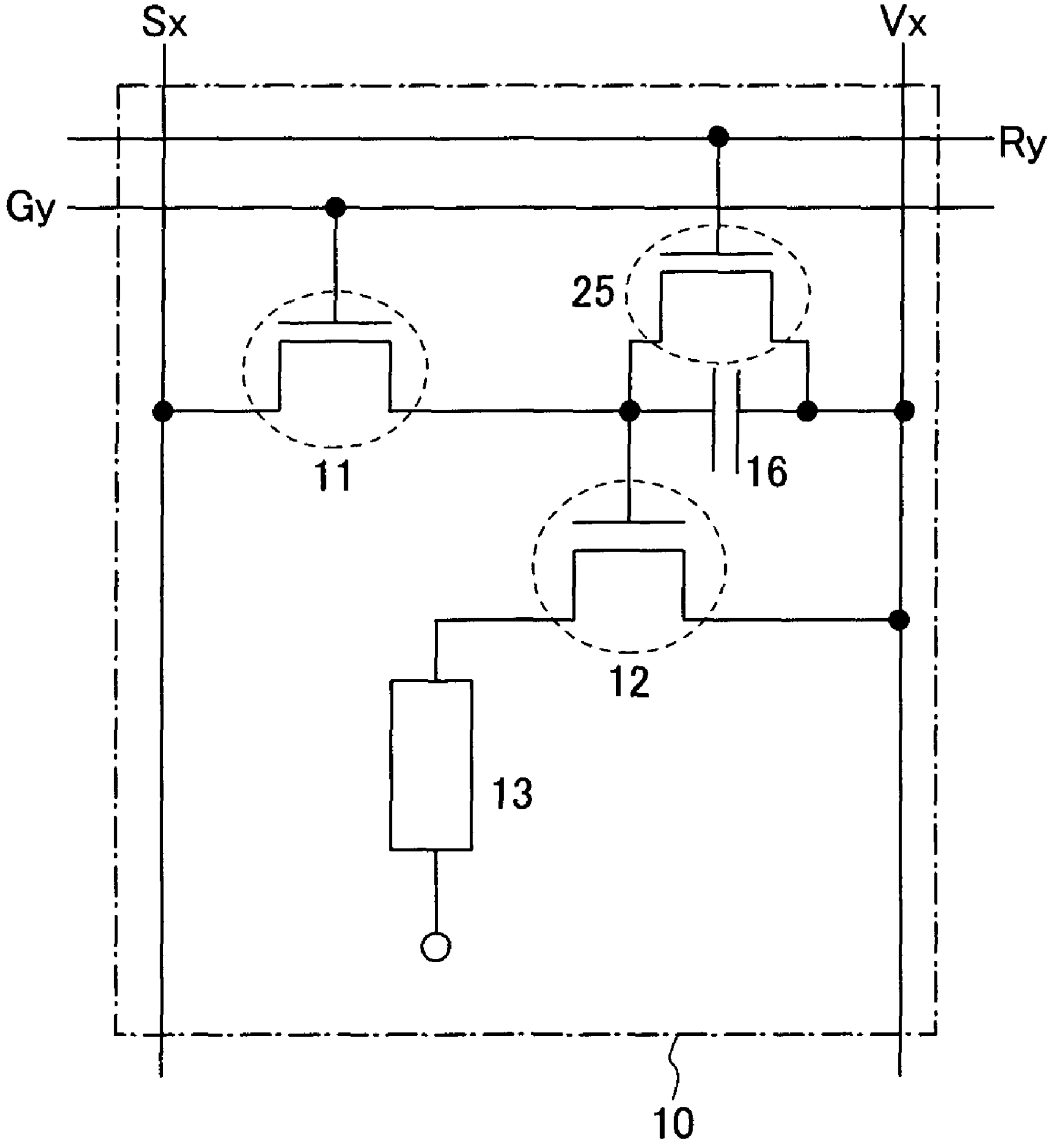
FIG. 20 is a diagram showing an equivalent circuit of a pixel of the present invention.

FIG. 20 shows a pixel structure in which a third transistor 25 which is connected to both ends of the capacitor 16 is provided in addition to the pixel structure shown in FIG. 2. The third transistor 25 functions to discharge the charges accumulated in the capacitor 16 during a predetermined period. The third transistor 25 is also referred to as an erasing transistor. The predetermined period is controlled by an erasing scan line Ry connected to a gate electrode of the third transistor 25.

For example, if a plurality of subframe periods is provided, the third transistor 25 discharges the charges of the capacitor 16 in a short subframe period. As a result, the duty ratio can be increased.

Figure 21A:
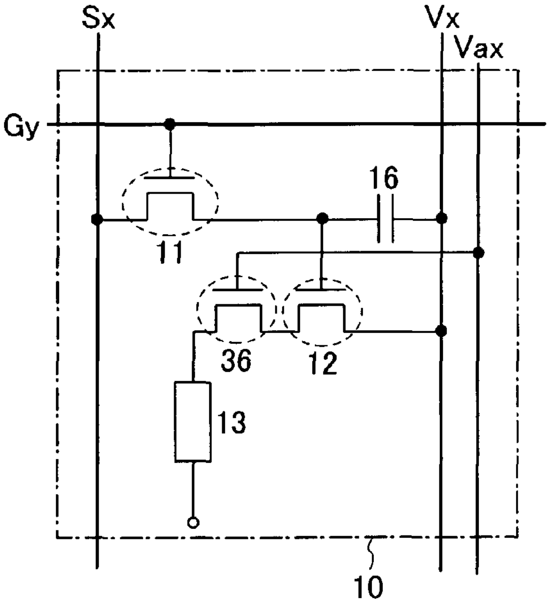
FIGS. 21A to 21C are diagrams showing equivalent circuits of a pixel of the present invention.

FIG. 21A shows a pixel structure in which a fourth transistor 36 is provided between the driving transistor 12 and the light emitting element 13 in addition to the pixel structure shown in FIG. 2. A gate electrode of the fourth transistor 36 is connected to a second power supply line Vax that has a fixed potential. Accordingly, a constant current can be supplied to the light emitting element 13 regardless of gate-source voltages of the driving transistor 12 and the fourth transistor 36. The fourth transistor 36 is also referred to as a current control transistor.

Figure 21B:
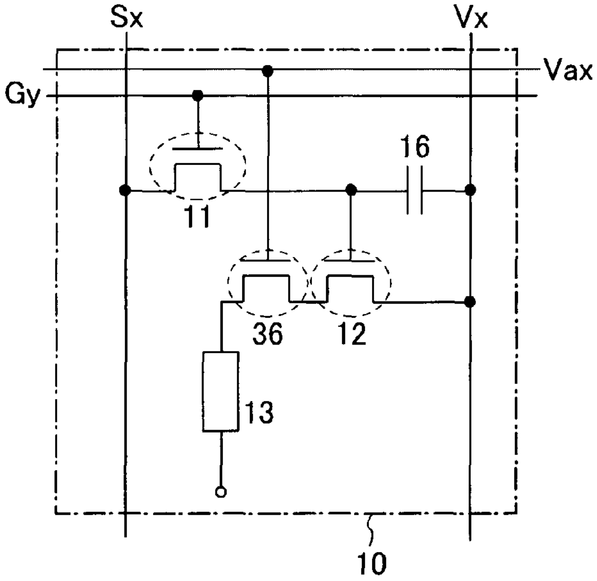

FIG. 21B shows a pixel structure in which the second power supply line Vax that has a fixed potential is provided in parallel to the scan line Gy, which is different from that shown in FIG. 21A.

Figure 21C:
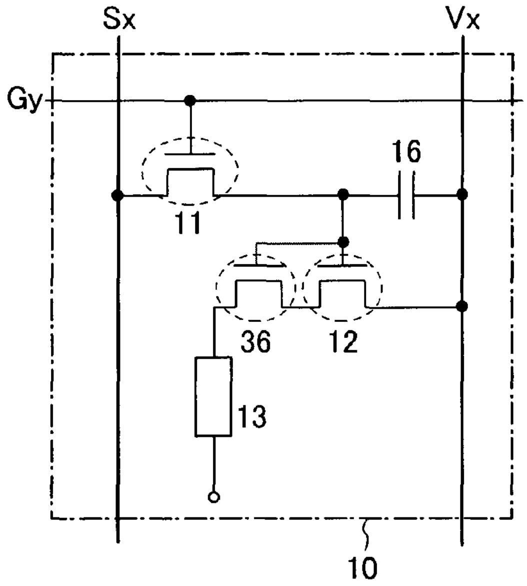

FIG. 21C shows a pixel structure in which the gate electrode of the fourth transistor 36 having a fixed potential is connected to the gate electrode of the driving transistor 12, which is different from those shown in FIGS. 21A and 21B.

With the pixel structure shown in FIG. 21C, in which a new power supply line is not required, the aperture ratio can be maintained.

Figure 22:
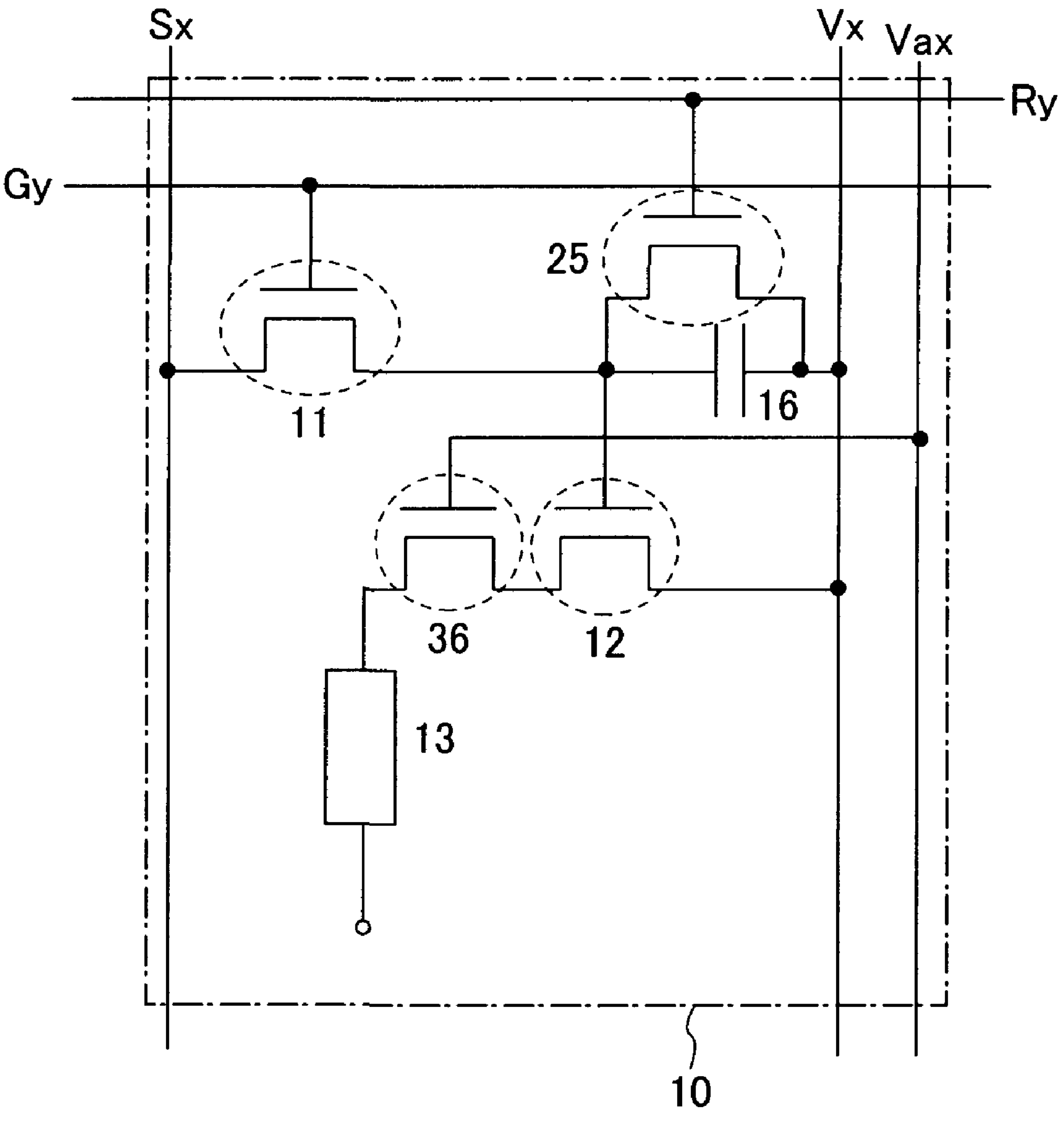
FIG. 22 is a diagram showing an equivalent circuit of a pixel of the present invention.

FIG. 22 shows a pixel structure in which the erasing transistor shown in FIG. 20 is provided in addition to the pixel structure shown in FIG. 21A. The erasing transistor can discharge the charges of the capacitor 16. It is needless to say that the erasing transistor can also be provided in the pixel structures shown in FIG. 21B and FIG. 21C.

In other words, the present invention can be applied regardless of the pixel structure.

Note that this embodiment mode can be implemented in free combination with the above embodiment modes.

Embodiment Mode 13

The present invention can also be applied to a display device that is driven with a constant current. This embodiment mode explains a case where the degree of change over time is detected using the monitor light emitting element 66 and a change over time of a light emitting element is compensated by correcting a video signal or a power source potential based on the above detection result.

In this embodiment mode, first and second monitor light emitting elements are provided. The first monitor light emitting element is supplied with a constant current from a first constant current source, and the second monitor light emitting element is supplied with a constant current from a second constant current source. When the value of current supplied from the first constant current source is made different from the value of current supplied from the second constant current source, the total amount of current flowing through the first monitor light emitting element is different from that flowing through the second monitor light emitting element. As a result, a difference in change over time is generated between the first and second monitor light emitting elements.

The first and second monitor light emitting elements are connected to an arithmetic circuit. The arithmetic circuit calculates a difference between potentials of the first monitor light emitting element and the second monitor light emitting element. The voltage value calculated by the arithmetic circuit is supplied to a video signal generating circuit. The video signal generating circuit corrects a video signal supplied to each pixel in accordance with the voltage value supplied from the arithmetic circuit. With such a structure, a change over time of the light emitting element can be compensated.

Note that a circuit for preventing a change in potential, such as a buffer amplifier circuit, may be provided between each monitor light emitting element and each arithmetic circuit.

In this embodiment mode, as an example of the pixel having a structure for constant current driving, a pixel using a current mirror circuit, or the like may be used.

Note that this embodiment mode can be implemented in free combination with the above embodiment modes.

Embodiment Mode 14

The present invention can be applied to a passive matrix display device. The passive matrix display device includes a pixel portion formed over a substrate, a column signal line driver circuit and a row signal line driver circuit that are located at the periphery of the pixel portion, and a controller for controlling the driver circuits. The pixel portion includes column signal lines arranged in the column direction, row signal lines arranged in the row direction, and a plurality of light emitting elements arranged in matrix. The monitor circuit 64 can be provided over the substrate where the pixel portion is formed.

In the display device of this embodiment mode, video data inputted to the column signal line driver circuit or a voltage generated in a constant voltage source can be corrected by the monitor circuit 64 in accordance with a change in ambient temperature and a change over time. Thus, a display device in which the influence of both a change in ambient temperature and a change over time is reduced can be provided.

Note that this embodiment mode can be implemented in free combination with the above embodiment modes.

Embodiment Mode 15

Examples of electronic devices each having a pixel portion including a light emitting element are as follows: a television device (simply also referred to as a television or a television receiver), a digital camera, a digital video camera, a cellular phone device (simply also referred to as a cellular phone or a cell phone), a portable information terminal such as PDA, a portable game machine, a computer monitor, a computer, an sound reproducing device such as a car audio system, an image reproducing device including a recording medium, such as a home-use game machine, and the like. Specific examples thereof are explained with reference to FIGS. 23A to 23F.

Figure 23A:
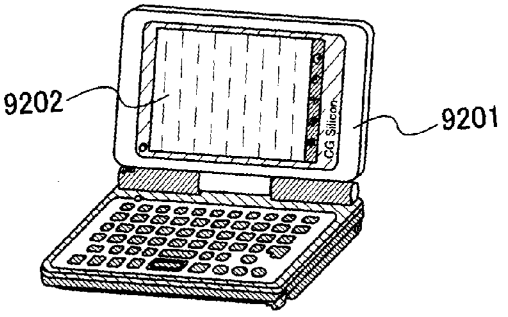
FIGS. 23A to 23F are diagrams showing electronic devices of the present invention.

A portable information terminal shown in FIG. 23A includes a main body 9201, a display portion 9202, and the like. The display device of the present invention can be applied to the display portion 9202. According to the present invention for correcting a power source potential to be supplied to a light emitting element by using a monitor light emitting element, it is possible to provide a portable information terminal in which the influence of a change in current value of the light emitting element due to a change in ambient temperature and a change over time is suppressed.

Figure 23B:
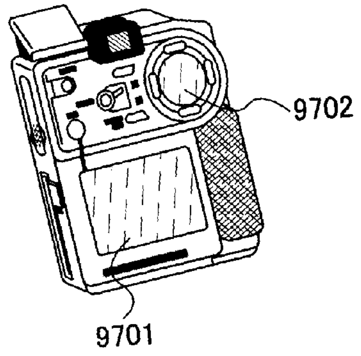

A digital video camera shown in FIG. 23B includes a display portion 9701, a display portion 9702, and the like. The display device of the present invention can be applied to the display portion 9701 and the display portion 9702. According to the present invention for correcting a power source potential to be supplied to a light emitting element by using a monitor light emitting element, it is possible to provide a digital video camera in which the influence of a change in current value of the light emitting element due to a change in ambient temperature and a change over time is suppressed.

Figure 23C:
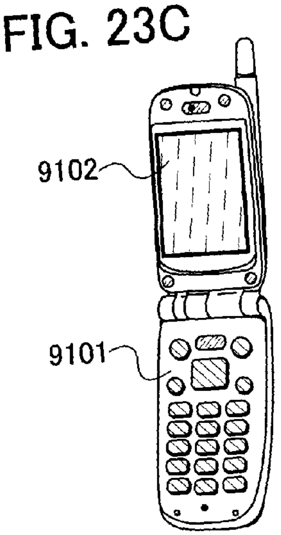

A cellular phone shown in FIG. 23C includes a main body 9101, a display portion 9102, and the like. The display device of the present invention can be applied to the display portion 9102. According to the present invention for correcting a power source potential to be supplied to a light emitting element by using a monitor light emitting element, it is possible to provide a cellular phone in which the influence of a change in current value of the light emitting element due to a change in ambient temperature and a change over time is suppressed.

Figure 23D:
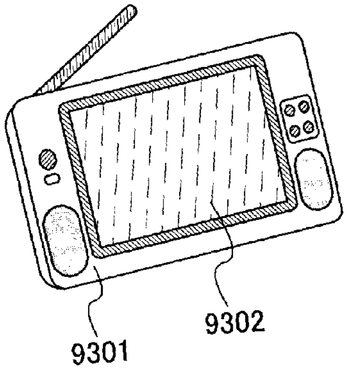

A portable television device shown in FIG. 23D includes a main body 9301, a display portion 9302, and the like. The display device of the present invention can be applied to the display portion 9302. According to the present invention for correcting a power source potential to be supplied to a light emitting element by using a monitor light emitting element, it is possible to provide a portable television device in which the influence of a change in current value of the light emitting element due to a change in ambient temperature and a change over time is suppressed. The display device of the present invention can be applied to a wide range of television devices ranging from a small television device mounted on a portable terminal such as a cellular phone, a medium television device which can be carried, to a large (for example, 40-inch or larger) television device.

Figure 23E:
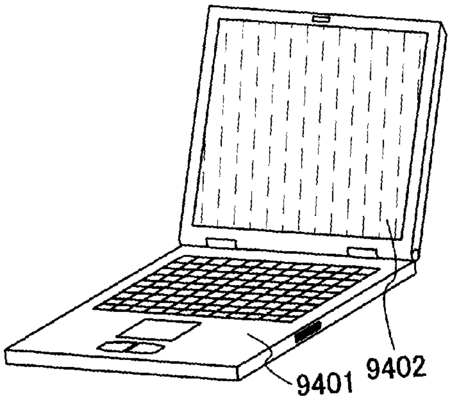

A portable computer shown in FIG. 23E includes a main body 9401, a display portion 9402, and the like. The display device of the present invention can be applied to the display portion 9402. According to the present invention for correcting a power source potential to be supplied to a light emitting element by using a monitor light emitting element, it is possible to provide a portable computer in which the influence of a change in current value of the light emitting element due to a change in ambient temperature and a change over time is suppressed.

Figure 23F:
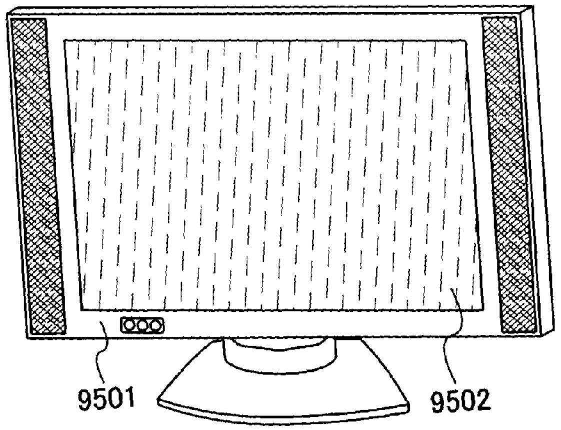

A television device shown in FIG. 23F includes a main body 9501, a display portion 9502, and the like. The display device of the present invention can be applied to the display portion 9502. According to the present invention for correcting a power source potential to be supplied to a light emitting element by using a monitor light emitting element, it is possible to provide a television device in which the influence of a change in current value of the light emitting element due to a change in ambient temperature and a change over time is suppressed.

This application is based on Japanese Patent Application serial no. 2005-378290 filed in Japan Patent Office on Dec. 28, 2005, the entire contents of which are hereby incorporated by reference.

What is claimed is:

1. A light emitting device comprising:

a light emitting element;

a buffer amplifier circuit;

an inspection power source;

a monitor light emitting element;

a monitor line configured to supply a current to the monitor light emitting element;

a short interruption circuit configured to interrupt a current which is supplied through the monitor line to the monitor light emitting element when the monitor light emitting element is short-circuited; and a unit configured to inspect whether the short interruption circuit interrupts the current which is supplied to the monitor light emitting element or not, wherein the inspection power source is configured to supply a constant voltage to the short interruption circuit, and wherein the inspection power source is electrically connected to the light emitting element and the buffer amplifier circuit is electrically disconnected from the light emitting element while the unit inspects the short interruption circuit.

2. A light emitting device comprising:

a light emitting element;

a buffer amplifier circuit;

an inspection power source;

a monitor light emitting element;

a monitor line configured to supply a current to the monitor light emitting element;

a first unit configured to supply a constant current to the monitor line;

a short interruption circuit configured to interrupt a current which is supplied through the monitor line to the monitor light emitting element when the monitor light emitting element is short-circuited; and a second unit configured to inspect whether the short interruption circuit interrupts the current which is supplied to the monitor light emitting element or not, wherein the inspection power source is configured to supply a constant voltage to the short interruption circuit, and wherein the inspection power source is electrically connected to the light emitting element and the buffer amplifier circuit is electrically disconnected from the light emitting element while the second unit inspects the short interruption circuit.

3. A light emitting device comprising:

a light emitting element;

a buffer amplifier circuit;

an inspection power source;

a monitor light emitting element;

a monitor line configured to supply a current to the monitor light emitting element;

a first unit configured to supply a constant current to the monitor line;

a short interruption circuit configured to interrupt a current which is supplied through the monitor line to the monitor light emitting element when the monitor light emitting element is short-circuited; and a second unit configured to inspect whether the short interruption circuit interrupts the current which is supplied to the monitor light emitting element or not, the second unit comprising a monitor inspection power supply which is electrically connected to one electrode of the monitor light emitting element through a monitor inspection transistor, wherein one of a source electrode and a drain electrode of the monitor inspection transistor is electrically connected to the monitor inspection power supply and the other is electrically connected to the one electrode of the monitor light emitting element, wherein the inspection power source is configured to supply a constant voltage to the short interruption circuit, and wherein the inspection power source is electrically connected to the light emitting element and the buffer amplifier circuit is electrically disconnected from the light emitting element while the second unit inspects the short interruption circuit.

4. A light emitting device comprising:

a light emitting element;

a buffer amplifier circuit;

an inspection power source;

a monitor light emitting element;

a monitor line configured to supply a current to the monitor light emitting element;

a first unit configured to supply a constant current to the monitor line;

a monitor control transistor;

a second unit configured to turn off the monitor control transistor when the monitor light emitting element is short-circuited; and a third unit configured to inspect whether the second unit turns off the monitor control transistor when the monitor light emitting element is short-circuited or not, the third unit comprising a monitor inspection power supply which is electrically connected to one electrode of the monitor light emitting element through a monitor inspection transistor, wherein one of a source electrode and a drain electrode of the monitor control transistor is electrically connected to the monitor line and the other is electrically connected to the one electrode of the monitor light emitting element, and wherein one of a source electrode and a drain electrode of the monitor inspection transistor is electrically connected to the one electrode of the monitor light emitting element and the other is electrically connected to the monitor inspection power supply, wherein the inspection power source is configured to supply a constant voltage to the third unit, and wherein the inspection power source is electrically connected to the light emitting element and the buffer amplifier circuit is electrically disconnected from the light emitting element while the third unit inspects the monitor light emitting element.

5. The light emitting device according to claim 1, wherein an input of the buffer amplifier circuit is connected to the monitor line, wherein an output of the buffer amplifier circuit is connected to one electrode of a driving transistor for the light emitting element, and wherein a voltage to be applied to the light emitting element is changed in accordance with a change in potential of one electrode of the monitor light emitting element.

6. The light emitting device according to claim 2, wherein an input of the buffer amplifier circuit is connected to the monitor line, wherein an output of the buffer amplifier circuit is connected to one electrode of a driving transistor for the light emitting element, and wherein a voltage to be applied to the light emitting element is changed in accordance with a change in potential of one electrode of the monitor light emitting element.

7. The light emitting device according to claim 3, wherein an input of the buffer amplifier circuit is connected to the monitor line and an output of the buffer amplifier circuit is connected to one electrode of a driving transistor for the light emitting element, and wherein a voltage to be applied to the light emitting element is changed in accordance with a change in potential of the one electrode of the monitor light emitting element.

8. The light emitting device according to claim 4, wherein an input of the buffer amplifier circuit is connected to the monitor line, wherein an output of the buffer amplifier circuit is connected to one electrode of a driving transistor for the light emitting element, and wherein a voltage to be applied to the light emitting element is changed in accordance with a change in potential of the one electrode of the monitor light emitting element.

9. A light emitting device comprising:

a first light emitting element;

a second light emitting element;

a monitor line configured to supply a current to the first light emitting element;

a short interruption circuit configured to interrupt a current which is supplied through the monitor line to the first light emitting element when the first light emitting element is short-circuited;

a unit configured to inspect whether the short interruption circuit interrupts the current which is supplied to the first light emitting element or not;

a buffer amplifier circuit; and an inspection power source, wherein the inspection power source is configured to supply a constant potential to the short interruption circuit; and wherein the inspection power source is electrically connected to the second light emitting element and the buffer amplifier circuit is electrically disconnected from the second light emitting element while the unit inspects the short interruption circuit.

10. A light emitting device comprising:

a first light emitting element;

a second light emitting element;

a monitor line configured to supply a current to the first light emitting element;

a first unit configured to supply a constant current to the monitor line;

a short interruption circuit configured to interrupt a current which is supplied through the monitor line to the first light emitting element when the first light emitting element is short-circuited;

a second unit configured to inspect whether the short interruption circuit interrupts the current which is supplied to the first light emitting element or not;

a buffer amplifier circuit; and an inspection power source, wherein the inspection power source is configured to supply a constant potential to the short interruption circuit, and wherein the inspection power source is electrically connected to the second light emitting element and the buffer amplifier circuit is electrically disconnected from the second light emitting element while the second unit inspects the short interruption circuit.

11. A light emitting device comprising:

a first light emitting element;

a second light emitting element;

a monitor line configured to supply a current to the first light emitting element;

a first unit configured to supply a constant current to the monitor line;

a short interruption circuit configured to interrupt a current which is supplied through the monitor line to the first light emitting element when the first light emitting element is short-circuited; and a second unit configured to inspect whether the short interruption circuit interrupts the current which is supplied to the first light emitting element or not, the second unit comprising a monitor inspection power supply which is electrically connected to one electrode of the first light emitting element through a monitor inspection transistor;

a buffer amplifier circuit; and an inspection power source, wherein the inspection power source is configured to supply a constant potential to the short interruption circuit, wherein the inspection power source is electrically connected to the second light emitting element and the buffer amplifier circuit is electrically disconnected from the second light emitting element while the second unit inspects the short interruption circuit, and wherein one of a source electrode and a drain electrode of the monitor inspection transistor is electrically connected to the monitor inspection power supply and the other is electrically connected to the one electrode of the first light emitting element.

* * * * *